United States Patent
Aridor et al.

(10) Patent No.: US 7,043,472 B2
(45) Date of Patent: May 9, 2006

(54) FILE SYSTEM WITH ACCESS AND RETRIEVAL OF XML DOCUMENTS

(75) Inventors: Yariv Aridor, Zichron-Yaakov (IL); Alain Charles Azagury, Nesher (IL); Michael Edward Factor, Haifa (IL); Yoelle Maarek, Haifa (IL); Benjamin Mandler, Zichron Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 511 days.

(21) Appl. No.: 10/270,705

(22) Filed: Oct. 11, 2002

(65) Prior Publication Data
US 2004/0215600 A1 Oct. 28, 2004

Related U.S. Application Data

(63) Continuation-in-part of application No. 09/873,084, filed on Jun. 4, 2001, now Pat. No. 6,745,206.

(60) Provisional application No. 60/209,475, filed on Jun. 5, 2000.

(51) Int. Cl.
*G06F 17/30* (2006.01)

(52) U.S. Cl. .................................. 707/3; 707/101

(58) Field of Classification Search ............. 707/1–10, 707/100, 101
See application file for complete search history.

(56) References Cited

U.S. PATENT DOCUMENTS

| | | | |
|---|---|---|---|
| 6,275,822 B1 * | 8/2001 | Consens et al. | 707/3 |
| 6,745,206 B1 * | 6/2004 | Mandler et al. | 707/104.1 |
| 2003/0149686 A1 * | 8/2003 | Drissi et al. | 707/3 |
| 2003/0225779 A1 * | 12/2003 | Matsuda | 707/102 |

* cited by examiner

*Primary Examiner*—Frantz Coby
*Assistant Examiner*—Marc Filipczyk
(74) *Attorney, Agent, or Firm*—Stephen C. Kaufman

(57) ABSTRACT

A XML-aware file system exploits attributes encoded in a XML document. The file system presents a dynamic directory structure to the user, and breaks the conventional tight linkage between sets of files and the physical directory structure, thus allowing different users to see files organized in a different fashion. The dynamic structure is based upon content, which is extracted using an inverted index according to attributes and values defined by the XML structure. In one application, a dynamically changing federated repository is searchable using a system of local and merged master indices, wherein query results are presented as virtual directory paths that are semantically organized.

16 Claims, 18 Drawing Sheets

| ALL FOLDERS | CONTENTS OF 'F:\PROFILE' | |
|---|---|---|
| | NAME | TYPE |
| [folders tree] | _DESC | FILE FOLDER |
| | _STAR | FILE FOLDER |
| | ADDRESS | FILE FOLDER |
| | BUSINESS-SUMMARY | FILE FOLDER |
| | EMPLOYEES | FILE FOLDER |
| | FAX | FILE FOLDER |
| | NAME | FILE FOLDER |
| | OFFICERS | FILE FOLDER |
| | PHONE | FILE FOLDER |
| | RECENT-EARNINGS | FILE FOLDER |
| | STATISTICS | FILE FOLDER |
| | TICKER | FILE FOLDER |
| [E:] | | |
| MNT ON 'PS68-35\D\BENNY'[F:] —94 | | |
|   _DESC | | |
|   _STAR | | |
|   PROFILE —102 | | |
|   PROFILE2 | | |

Fig. 7

```
<!DOCTYPE PROFILE SYSTEM "/D:/BENNY/XMLFS/FILES/PROFILE.DTD">
<PROFILE>
    <NAME> AUTOBYTEL.COM. INC. ,/NAME>
    <TICKER>NASDAQ: ABTL </TICKER>              136
    <ADDRESS>
        <STREET>10072 MACARTHUR BOULEVARD</STREET>
        <CITY>IRVINE</CITY>
        <ZIP>CA 92612</ZIP>
    </ADDRESS>
    <PHONE> (949) 225-4500</PHONE>
    <FAX> (949 225-4541</FAX>
    <EMPLOYEES> 100</EMPLOYEES>
    <OFFICERS>
        <OFFICER NAME="MICHAEL FUCHS, " TITLE="CHMN."/>
        <OFFICER NAME="MARK W. LORIMER, " TITLE="PRES./CEO"/>
        <OFFICER NAME="ANN M. DELLIGATTA, " TITLE="EXEC.VP/COO"/>
        <OFFICER NAME="HOSHI PRINTER, " TITLE="SR.VP/CFO"/>
        <OFFICER NAME="ROBERT S. GRIMES, " TITLE="EXEC.VP"/>
        <OFFICER NAME="ARIEL AMIR, " TITLE="COUNSEL/VP"/>
    </OFFICERS>
    <BUSINESS-SUMMARY>
    AUTOBYTELL.COM, INC. IS A BRANDED INTERNET SITE FOR NEW AND
    USED VEHICLE INFORMATION AND PURCHASING
    </BUSINESS-SUMMARY>
    <RECENT-EARNING>

</RECENT-EARNING>
    <STATISTICS>
    <PRICEAND VOLUME UPDATED="JULY 16, 1999">
    <PRICE TYPE="52-WEEK-LOW">14.125</PRICE>
    <PRICE TYPE="RECENT">20.875</PRICE>
    <PRICE TYPE="52-WEEK-HIGH">58.00</PRICE>
    <BETA> </BETA>
```

Fig. 10

FILE SYSTEM WITH ACCESS AND RETRIEVAL OF XML DOCUMENTS

This application is a continuation-in-part of application Ser. No. 09/873,084, filed Jun. 4, 2001, now U.S. Pat. No. 6,745,206, issued Jun. 1, 2004, which claims the benefit of Provisional Application No. 60/209,475, filed Jun. 5, 2000.

BACKGROUND OF THE INVENTION

1. Field of the Invention

This invention relates to computer file systems. More particularly, this invention relates to an improved semantically based system for dynamically organizing XML files or files with markup tags in a context sensitive manner, so as to enable a shared federated repository to be browsed in a manner that is intuitive to a user.

2. Description of the Related Art

It has been recognized that static, hierarchical systems of organizing documents are inadequate to efficiently meet the needs of computer users attempting to access increasingly vast amounts of dynamically changing information. Conventional file systems are simply too unwieldy to deal with this information load in a way that is convenient to the user. They have become increasingly impractical for efficient document management.

A relational database is an alternative to a file system as a repository for documents, and many databases today provide some support for documents such as extended markup language (XML) documents. The XML document type declaration contains, or points to, markup declarations that provide a grammar for a class of documents. This grammar is known as a document type definition (DTD). However, the flexible document type declaration of a XML document, while easily represented as a graph, does not map naturally or efficiently into a flat static table. Moreover, the standard query language (SQL) interface of databases is not as commonly used in software applications, as is the conventional file system interface. Furthermore, management of large databases often requires a skilled administrator.

This approach to controlling the information explosion involves attaching metadata to documents. For example, using the MPEG-7 standard it is possible to attach attributes to video data.

It is proposed in the document *Semantic File Systems*. D. Gifford, P. Jouvelot, M. Sheldon, and J. O'Toole Jr., *In Proc. 13th ACM Symposium on Operating Systems Principles*, October 1991, pp. 16–25, to provide access to documents using queries. Virtual directories are created, each pointing to files that satisfy a query. The concepts presented in this document provide a foundation for the invention disclosed herein.

The document Presto: *An Experimental Architecture for Fluid Interactive Document Spaces*, Paul Dourish, W. Keith Edwards, Anthony LaMarca, and Michael Salisbury, ACM Transactions on Computer-Human Interaction, 6(2) 1999, and the document *Using Properties for Uniform Interaction in the Presto Document System*, Paul Dourish, W. Keith Edwards, Anthony LaMarca, and Michael Salisbury, in Proceedings of the ACM Symposium on User Interface Software and Technology, UIST '99, Asheville, N.C., 1999, together disclose a document management system that emphasizes the attributes of documents being retrieved, while retaining some structural aspects of conventional file systems. The system is driven by attributes that are manually attached to the files, or extracted from the files using a filter. The attributes, including content, may be arbitrarily defined by different users and their numbers extended, such that different users have entirely different view of the document space. This arrangement has the drawbacks of requiring the user to execute a separate application using a separate interface.

Another approach is taken in the document, *Integrating Content-Based Access Mechanisms with Hierarchical File Systems*, B. Gopal and U. Manber, Operating Systems Design and Implementation (OSDI), 1999. This document proposes to extend the file system interface, wherein users are able to create their own name spaces based on queries, path names, or combinations thereof. This approach has a drawback in that interoperability with existing applications is difficult.

Retrieval of information from federated data repositories is a field of increasing importance. A federated data repository typically comprises heterogeneous data distributed across an enterprise.

Distributed file systems, for example the Andrew File System (AFS), and the Network File System (NFS), provide a measure of information sharing. Hierarchical trees from different sources are exposed to the user by gluing the different tree structures side-by-side. The distributed file system can then be used to share information from the different sources. Thus, information from separate sources is typically presented side by side.

Peer-to-peer communication over data networks, realized, for example, in the currently popular Napster and Gnutella systems, embody a powerful concept for sharing and exchanging information over the Internet. Nevertheless, they utilize proprietary, specially tailored interfaces, and rely heavily on file naming for locating files.

Current peer-to-peer file sharing services allow for search, but do not support browsing well. Moreover, the search in such systems is typically based on file names, which lack necessary information, and may even be misleading. This is because naming conventions are not consistently enforced in such systems, and users are free to invent file names, which may have little relation to the file content.

Internet search engines typically employ search indices. However, these indices are not context sensitive, and irrelevant information is often returned from them on query. For example, when searching for a song called "Let It Be", a free text search invariably retrieves many unrelated documents in which the search text appears. Moreover, updating of the indices is limited by the efficiency of offline Web crawling. Thus, Internet search indexes cannot be relied upon to be up-to-date. Typically, a snapshot of the indices in the system is taken from time to time, and serves as the basis for the query results. Ongoing changes in existing documents, document additions and deletions are not visible on query until the next scheduled index build.

Wide Area Information Servers (WAIS) is an arrangement that is intended to help users locate information over networks. This represents a unified interface that relies on natural language questions, and employs indexing. However, once again, the information in the indices is not context sensitive. Conventional free text searching and ranking is performed. WAIS is disclosed in further detail in the document, *An Information System for Corporate Users: Wide Area Information Servers*, B. Kahle, et al., ONLINE, Vol. 15, No. 5, p. 56–60, September 1991.

Distributed Lightweight Directory Access Protocol (LDAP) and X.500 (International Standard ISO/IEC 9594-1) services, when queried, may cause one server to refer the client to a second server. Alternatively, the first server may query the second server, should it be unable to respond to the query. LDAP queries inherently force the user to specify attributes and values in constructing his query. Thus, these services are suitable only when there is ample advance knowledge of the subject.

Bio-informatics is an exemplary rapidly growing field in which above-noted difficulties in information retrieval from a variety of unrelated sources arise frequently, and are often stumbling blocks to research. A life sciences company typically has data stored in a cluster of repositories, and in multiple formats. Conventionally, it would be necessary to tailor a specific application in order to deal with the extraction and combination of data from all the sources. Furthermore, it is not uncommon for an external organization to gain access to several such clusters from several such companies. Using conventional technology, it is indeed daunting to try to establish a coherent system for convenient access to all the data. What is needed is a friendly facility from which to be able to query all the different data sources at once, and obtain combined results.

More generally, in the field of retrieval of information from federated repositories or the Internet, there is no efficient manner in which to combine several distinct resource repositories in a way that is convenient to use and is capable of supplying a meaningful response to a query in a dynamic environment. In such environments in such repositories not only do the resources themselves change with time, but the participating sites also vary.

SUMMARY OF THE INVENTION

It is a primary advantage of some aspects of the present invention that existing applications using the conventional file system applications programming interface (API) are supported.

It is still another advantage of some aspects of the invention that file organization dynamically accommodates changes in the document space.

If is a further advantage of some aspects of the invention that different users may see files organized in a different fashion, and that a given user is able to see the files organized in different ways.

It is yet another advantage of some aspects of the invention that a user can quickly determine what information is contained in a repository of files in a given context.

It is still a further advantage of some aspects of the invention that functions of internet search engines and distributed resources sharing services are combined and enhanced in a presentation that is convenient to a user seeking to locate information.

These and other advantages of the present invention are attained by a file system, which in a preferred embodiment exploits attributes encoded in a XML document. The file system presents a dynamic directory structure to the user, and breaks the conventional tight linkage between sets of files and the physical directory structure, thus allowing different users to see files organized in a different fashion. The dynamic structure is based upon content, which is extracted according to attributes defined by the XML structure. In accordance with the invention, the information from different sources is actually fused together in the same location. Thus, a user is able to locate all the files he had authored in a single directory rather than in multiple physically distributed directories, possibly as many as one directory per data source.

In a preferred embodiment of the invention, a XML-aware file system (XMLFS) combines the interface of a conventional file system with the organizational power of information retrieval to provide a repository for XML documents. It provides a solution for organizing, searching and browsing collections of XML documents. The semistructured nature of documents that comply with the XML standard implies that XML documents readily include metadata. Because of its popularity, XML appears to be an ideal format for innovation that results in sensibly ordering an ever-growing amount of information.

To the user, the XML-aware file system appears to be a completely conventional standard file system, and it supports any existing application that employs a standard file system applications programming interface. In addition, in some embodiments, since the XML-aware file system is built upon an existing file system, it can exploit existing support facilities, for example backup facilities.

In an important departure from the view presented by traditional hierarchical file systems, instead of showing files organized in a static directory structure, the XML-aware file system shows files organized in a dynamic hierarchy which is constructed on-the-fly. The user of the XML-aware file system is informed by the directory path as to what content is relevant at a particular instance in time. A directory path in the XML-aware file system is a sequence of attributes and values, and the contents of a directory are all of the XML documents that have the attributes and values named in the path. In other words, a directory path in the XML-aware file system reflects a query for a set of documents matching a set of constraints. As the path is being incrementally constructed, the user of the file system browses through a set of documents that match a partial query.

One aspect of the invention enables extraction of information in a federated repository composed of many different sources in disparate formats, each having its own directory structure. Navigation through the repository is accomplished in an intuitive and unified manner by providing a "file system union". The file system union is a taxonomy union of all distinct taxonomies residing on separate repositories, either on one machine, or distributed among many machines. The file system union is achieved without prearranged categorization of the available information, and without a priori knowledge of the kind of resources that may be encountered in the repository, or their content. Furthermore, no knowledge is presumed as to the kinds of queries, which will be made against the information in the federated repository.

Multiple instances of a XMLFS-like system are connected in a distributed fashion. Each individual instance or client maintains an index of the information that it holds locally. Upon start up, the local instance will register itself in a central register, which serves as the combined registry for the distributed system. Many different distributed indexing architectures are supported in this manner. When a document is located on one of the instances, it is brought to the client via a standard NFS protocol, which is supported by all XMLFS instances. Whenever an instance ceases its operation, it deletes itself from the central register. In case of a crash rather than a clean shutdown of one of the instances, the failed instance will be deleted the next time another instance attempts to connect to it.

In one aspect of the invention, inverted indices are prepared for each data repository, and the different individual repository indices are merged, physically or logically, into a higher level, multidimensional index. Unlike the above-noted AFS system of side-by-side presentation and sharing, elements in the structure representing identical entries are actually fused in the merged index. The merged index supports a display in response to a query of a unified intuitive structure that enables rapid location of needed information, without foreknowledge of a document identity or even a precise specification of the subject matter being sought. A display of query results presents an indication of what information is available in a region or context in which interest has been expressed.

The invention provides a computer implemented method of information retrieval, including the steps of retrieving structural information of memorized XML documents according to a document type declaration that corresponds to each of the documents, retrieving elements of the documents, attributes and values of the elements. The method further includes generating a multilevel inverted index from the structural information, the elements, the attributes and the values, and accepting a specification from a user that has members comprising at least one of the elements, the attributes or the values. The method further includes extracting data from the index responsive to the specification, wherein the data complies with at least one of the members. The method further includes displaying virtual directory paths of corresponding ones of the documents, wherein the directory paths each comprise a sequence of the members, and wherein contents of directories that are identified in the directory paths comprise selected ones of the documents possessing the specification.

According to an aspect of the method, the index includes a structural section that has postings of the structural information, and a words section that has postings of the values, wherein the values are words.

One aspect of the method includes arranging the directory paths in a hierarchy that is constructed in conformance with the specification. Arranging can be accomplished by extracting a document identifier from one of the postings of the values, extracting an offset of a context from the one of the postings of the values, and extracting an entry length of the context from the one of the postings of the values.

According to one aspect of the method, the documents are written in a markup language.

According to still another aspect of the method, the documents are XML documents.

An additional aspect of the method includes noting changes in a composition of a repository of the documents, and updating the index responsive to the changes.

According to another aspect of the method, the specification includes a partial query and a complete query.

According to yet another aspect of the method, a portion of the specification is stated as a path name by the user.

The invention provides a computer software product, including a computer-readable medium in which computer program instructions are stored, which instructions, when read by a computer, cause the computer to perform the steps of retrieving structural information of memorized documents according to a document type declaration that corresponds to each of the documents, retrieving elements, attributes and values of the elements, generating a multilevel inverted index from the structural information, the elements, the attributes and the values, and accepting a specification from a user that comprises at least one of the elements, the attributes and the values. Responsive to the specification the computer further performs the steps of extracting data from the index, associating the data with corresponding ones of the documents, and displaying the corresponding ones of the documents as virtual directory paths, wherein the directory paths each comprise a sequence of elements, the attributes and the values, and wherein contents of directories that are identified in the directory paths comprise selected ones of the documents possessing the specification.

According to an aspect of the computer software product, the index includes a structural section that has postings of the structural information, and a words section that has postings of the values, wherein the values are words.

An additional aspect of the computer software product includes arranging the directory paths in a hierarchy that is constructed in conformance with the specification. Arranging the directory paths can include extracting a document identifier from one of the postings of the values, extracting an offset of a context from the one of the postings of the values, and extracting an entry length of the context from the one of the postings of the values.

According to one aspect of the computer software product, the documents are written in a markup language.

According to another aspect of the computer software product, the documents are XML documents.

A further aspect of the computer software product includes noting changes in a composition of a repository of the documents, and updating the index responsive to the changes.

According to yet another aspect of the computer software product, the specification includes a partial query and a complete query.

According to still another aspect of the computer software product, the specification is stated as a path name by the user.

According to one aspect of the computer software product, the specification is issued via a file system applications programming interface.

According to another aspect of the computer software product, the instructions define a file system engine that issues calls to an operating system.

The invention provides a computer implemented information retrieval system for presenting a semantically dependent directory structure of XML files to a user, including a file system engine that receives a file request via a file system application programming interface and issues file system calls to an operating system, wherein the file request specifies a file content of memorized files. The system also includes a XML parser linked to the file system engine that retrieves structural information of XML documents, the XML parser further retrieving at least one of elements, attributes and respective values thereof from the XML documents. The system also includes an indexer linked to the XML parser for constructing an inverted index of the elements, the attributes and the respective values thereof, wherein responsive to the file request, the file system engine retrieves postings of the inverted index that satisfy requirements of the file request, and returns directory paths to the file system application programming interface of selected ones of the XML documents corresponding to the postings.

According to an aspect of the information retrieval system, the inverted index includes a structural section that has postings of the structural information, and a words section that has postings of words of the XML documents.

According to yet another aspect of the information retrieval system, the postings of the structural information and the postings of words comprise a document identifier of one of the XML documents, an offset of a context in the one XML document, and an entry length in the context of the one XML document.

Still another aspect of the information retrieval system includes a XML analyzer for updating the inverted index, wherein the XML analyzer analyzes additions to the memorized files.

According to an additional aspect of the information retrieval system, the XML parser retrieves the structural information from document type declarations of the XML documents.

According to one aspect of the information retrieval system, the file request includes a partial query and a complete query.

According to another aspect of the information retrieval system, a portion of the file request is a path name.

According to a further aspect of the information retrieval system, the repository of the XML documents can be a networked file system.

The invention provides a computer implemented information retrieval system for presenting a semantically dependent directory structure of document files to a user, wherein documents of the document files are written in a markup language, including a file system engine that receives a file request via a file system application programming interface and issues file system calls to an operating system, wherein the file request specifies a file content of memorized files. The system includes a parser of the markup language, linked to the file system engine, that retrieves structural information of the documents, the parser further retrieving at least one of elements, attributes and respective values thereof from the documents. The system includes an indexer, linked to the parser, for constructing an inverted index of the elements and the attributes and the respective values thereof, wherein responsive to the file request, the file system engine retrieves postings of the inverted index that satisfy requirements of the file request, and returns directory paths to the file system application programming interface of selected ones of the documents corresponding to the postings.

According to an aspect of the information retrieval system, the inverted index includes a structural section that has postings of the structural information, and a words section that has postings of words of the documents.

According to one aspect of the information retrieval system, the postings of the structural information and the postings of words include a document identifier of one of the documents, an offset of a context in the one document, and an entry length of the context in the one document.

Another aspect of the information retrieval system includes an analyzer for updating the inverted index, wherein the analyzer analyzes additions to the memorized files.

According to a further aspect of the information retrieval system, the parser retrieves the structural information from document type declarations of the documents.

According to yet another aspect of the information retrieval system, the file request includes a partial query and a complete query.

According to still another aspect of the information retrieval system, a portion of the file request is a path name.

According to an additional aspect of the information retrieval system, a repository of the documents can be a networked file system.

The invention provides a method of information retrieval from a federated repository. For each data source in the federated repository, the method includes generating an inverted repository index in a common format to define a plurality of repository indices. The method further includes merging the repository indices into a master index, wherein semantically common elements of the repository indices are fused into a single element, accepting a query for information contained in the federated repository. Responsive to the query, the method further includes consulting the master index to identify documents of the federated repository having characteristics semantically consistent with the query, and displaying virtual directory paths of the documents that are organized according to semantics of the documents.

In an aspect of the method merging is performed by merging different ones of the repository indices into a plurality of secondary merged indices, and merging the secondary merged indices into the master index.

According to a further aspect of the method, an identification of the documents of the federated repository includes a data source of origin, and an identification of one of the repository indices.

Yet another aspect of the method includes dynamically adding new repository indices and deleting current repository indices that respectively become available and unavailable in the federated repository.

In still another aspect of the method, consulting the master index includes simultaneously consulting different ones of the repository indices that are merged therein.

In an additional aspect of the method generating the repository index in the common format is performed using a XML parser.

The invention provides a method of information retrieval from a federated repository. For each of a plurality of data sources in the federated repository, an inverted repository index is generated in a common format. The method further includes accepting a query in a query manager for information contained in the federated repository to define a plurality of repository indices, distributing the query to the repository indices. Responsive to the query, the method further includes consulting each of the repository indices to develop indications of documents of one of the data sources associated therewith that satisfy the query, returning the indications from the repository indices to the query manager, and merging the indications into a unitary response to the query that includes virtual directory paths of the documents that are organized according to semantics of the documents.

According to one aspect of the method, an identification of the documents of the federated repository includes one of the data sources, and an identification of one of the repository indices.

Another aspect of the method includes dynamically adding new repository indices and deleting current repository indices that respectively become available and unavailable in the federated repository.

In a further aspect of the method generating the repository index in the common format is performed using an XML parser.

The invention provides a computer software product, including a computer-readable medium in which computer program instructions are stored, which instructions, when read by a computer, cause the computer to perform a method of information retrieval from a federated repository, including for each data source in the federated repository generating an inverted repository index in a common format, merging each the inverted repository index into a multidimensional master index, wherein semantically common elements of each the inverted repository index are fused into a single element in the master index, accepting a query for information contained in the federated repository. Responsive to the query, the method includes consulting the master index to identify documents of the federated repository having characteristics semantically consistent with the query and displaying virtual directory paths of the documents that are organized according to semantics of the documents.

The invention provides an information retrieval system for accessing a federated repository, wherein a master server linked to a plurality of client servers. Each of the client servers has a data source of the federated repository stored therein. The client servers have access to a first program for generating an inverted repository index of the data source in a predetermined format. The master server has a second program for merging the repository indices of the client servers into a master index, wherein semantically common elements of the repository indices are fused into a single element in the master index. The master server has a third program for accepting a query for information contained in the federated repository, and responsive to the query, consulting the master index to identify documents of the federated repository having characteristics semantically consistent with the query, and providing a display of virtual directory paths of the documents that are organized according to semantics of the documents.

According to an aspect of the information retrieval system, an identification of the documents of the federated repository includes its associated data source.

According to another aspect of the information retrieval system, the identification of the documents further includes an identification of one of the repository indices.

According to one aspect of the information retrieval system, the second program of the master server is adapted for dynamically adding new repository indices and deleting current repository indices that respectively become available and unavailable in the federated repository.

The invention provides an information retrieval system for accessing a federated repository, including a plurality of master servers, each linked to a plurality of client servers. Each of the client servers has a data source of the federated repository stored therein. The client servers have access to a first program for generating an inverted repository index of their respective data sources in a predetermined format. The master servers each have a second program for merging the repository indices of the client servers into a master index, wherein semantically common elements of the repository indices are fused into a single element in the master index. A query server is linked to the master servers. The query server has a third program for accepting a query for information contained in the federated repository. The query server has a fourth program for distributing the query to the master servers and for instructing the master servers to consult their respective master indices to identify documents of the federated repository having characteristics semantically consistent with the query. The query server has a fifth program for receiving from the master servers result reports, including virtual directory paths of the documents that are organized according to semantics of the documents, and for organizing the reports into a common display.

BRIEF DESCRIPTION OF THE DRAWINGS

For a better understanding of these and other objects of the present invention, reference is made to the detailed description of the invention, by way of example, which is to be read in conjunction with the following drawings, wherein:

FIG. 7 is a representation of a computer monitor screen display in accordance with a preferred embodiment of the invention;

FIG. 10 is a representation of a computer monitor screen display in accordance with a preferred embodiment of the invention;

DESCRIPTION OF THE PREFERRED EMBODIMENT

In the following description, numerous specific details are set forth in order to provide a thorough understanding of the present invention. It will be apparent however, to one skilled in the art that the present invention may be practiced without these specific details. In other instances well-known circuits, control logic, and the details of computer program instructions for conventional algorithms and processes have not been shown in detail in order not to unnecessarily obscure the present invention. Software programming code, which embodies aspects of the present invention, is typically maintained in permanent storage, such as a computer readable medium. In a client/server environment, such software programming code may be stored on a client or a server. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. The techniques and methods for embodying software program code on physical media and distributing software code via networks are well known and will not be further discussed herein.

While the teachings of the invention are disclosed with reference to a XML-aware file system, the invention is not limited to XML documents. It can be applied to documents written in other markup languages. The teachings herein can be applied to any sort of database-mail combination, for example Lotus Notes®, and not necessarily in a file system. The file system is the currently preferred embodiment, as it is universally familiar and is known to be an interoperable repository for storing documents. Almost all applications work with a file system interface. In addition, there is a large set of support facilities for file systems, e.g., backup, and security utilities. Moreover, there are numerous applications written for the file system applications programming interface. Those applications can operate with the present invention without any modifications whatsoever.

Figure 1:
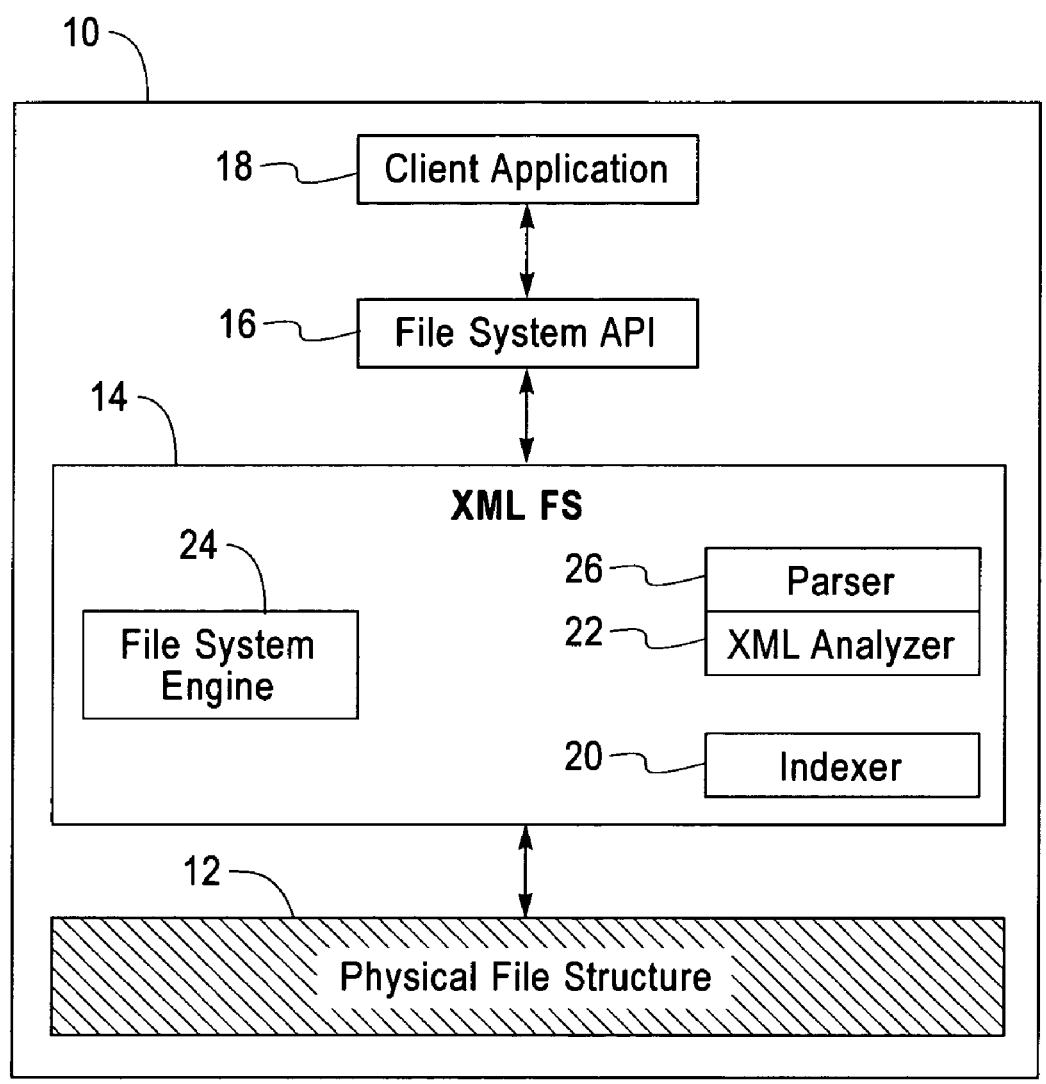
FIG. 1 is a block diagram of a XML-aware file system according to a preferred embodiment of the invention.

Turning now to the drawings, reference is made to FIG. 1, which displays a high level block diagram of a XML-aware file system, which is constructed and operative in accordance with a preferred embodiment of the invention. An arrangement 10 allows a computer user to access stored data. In the arrangement 10, there is a basic underlying physical file structure 12, which is conventional. The file structure 12 can be realized by a physical file system. A XML-aware file system 14 forms a functional layer between the file structure 12 and the file system applications programming interface 16 that is seen by a user application 18. Shielded by the file system applications programming interface 16, the XML-aware file system 14 presents itself to the outside world in a completely standard fashion.

The XML-aware file system 14 has several components that cooperate to provide a file system applications programming interface for accessing files in a context-sensitive manner. These components include an indexer 20, a XML analyzer 22, and a file system engine 24.

The indexer 20 produces a multilevel inverted index that can support several kinds of queries. Queries that are supported include supplying all valid values in a given context, including child elements, attributes, and actual values from the files stored in the repository. An example of this type of query is, "Supply all possible values of the context /profile/name". In other words, supply all child elements and attributes of the element "name", and all the values of this element from the files themselves.

Another supported query is a request to supply all files which have a particular value in a given context. An example is the query, "Supply all the files which have the word INC in the context /profile/name".

The conjunction of several queries is supported, for example the query "/profile/name/INC/and/profile/ticker". This query will supply all valid values in the context /profile/ticker from all the files which have the word INC in their /profile/name element.

The XML analyzer 22 is responsible for updating the index created by the indexer 20 when newer files appear. The file system engine 24 implements basic file system functions, and may do this by building upon an existing file system, for example by issuing basic file system calls to the operating system. A main difference of the file system engine 24, as compared with a conventional file system engine, is the consultation of the indexer 20 when information about the directory structure is required. This occurs, for example, when reading, or traversing directories. The file system engine 24 receives instructions from the file system applications programming interface 16. It then passes a directory path to the indexer 20, which interprets the path as a query. The indexer 20 returns information which enables the file system engine 24 to respond to the file system applications programming interface 16 as if a conventional directory were accessed.

The XML-aware file system 14 adapts the concept of semantic file systems, which is proposed in the above noted document, *Semantic File Systems*, and uses it in combination with information retrieval techniques in the context of XML documents. Semantic file systems attempt to gather underlying semantics of the files, and present the files to the users in virtual directories that are organized according to the file semantics in order to ease navigation. The XML-aware file system 14 exploits the file content to derive metadata, which is, needed in order to automatically and semantically organize the files. In order to derive the metadata, each file that is added to the file structure 12 has to be parsed in order to retrieve meaningful information that makes the search functions and browse functions of a XML document repository possible. The XML-aware file system 14 uses a XML-parser 26, which is associated with the XML analyzer 22. The XML-parser 26 retrieves the underlying structural information of a XML document, as well as individual elements and attributes, together with their respective values. A conventional IBM parser, XML4J, is suitable. This structural information, which is an integral part of the document according to well-known XML specifications, is used by the indexer 20 to construct an inverted index that supports automatic meaningful organization of documents by content. This process is completely automatic and transparent to the user.

In the currently preferred embodiment, the components of the XML-aware file system 14 are written in Java. However, many programming languages could be equally applied. A prototype system currently operates under the Microsoft Windows® Operating System.

Figure 2:
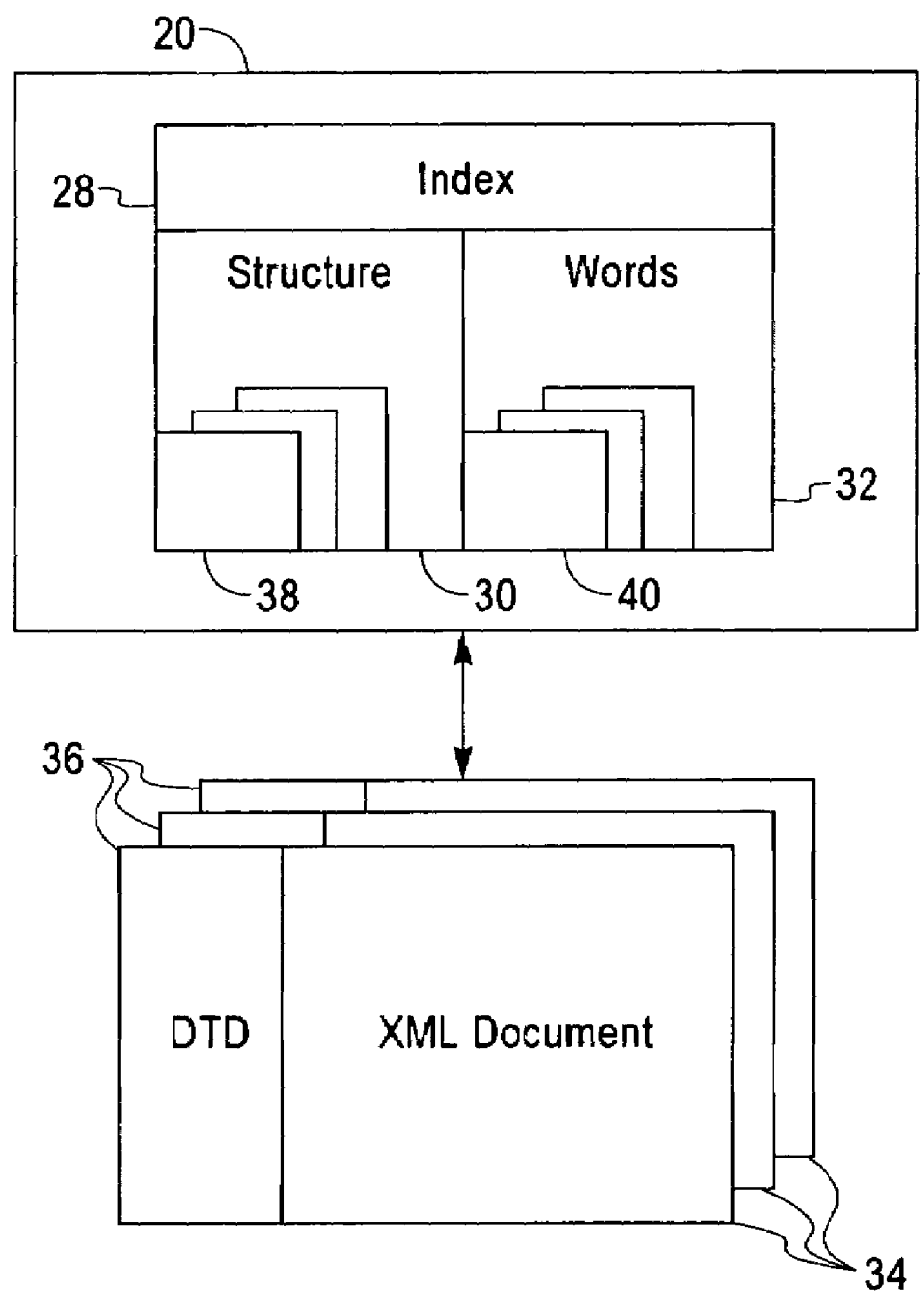
FIG. 2 is a block diagram illustrating aspects of an indexer that is used in the file system shown in FIG. 1 in accordance with a preferred embodiment of the invention.

Reference is now made to FIG. 2, which illustrates aspects of the indexer 20 in further detail. The description of FIG. 2 is to be read in conjunction with FIG. 1. The indexer 20 operates on a multilevel inverted index 28. The index 28 consists of two main portions, a structural section 30, and a words section 32. The structural section 30 is compliant with each underlying structure of each document 34 being indexed, as dictated by its respective DTD 36, and the words section 32 keeps track of all the words which appear as values in each of the documents 34. The structural section 30 maintains a list of postings 38 for each element of the document 34, and the words section 32 maintains a list of postings 40. The postings 38, 40 include a file identification, offset and length, and are accessed from the index 28 when preparing responses to relevant queries.

A new entry in the structural section 30 is created only once for each different DTD encountered during the essentially using queries to indicate what content is relevant at each point in time. A directory path is a sequence of attributes, names and values, and the contents of a directory comprise all the XML documents, which have the attributes and values, named in the path. There are two types of queries: partial and complete. A partial query is invoked in order to retrieve all possible child elements that are placed in various levels of a hierarchical virtual directory. The partial query also retrieves attributes, and actual values in the current context from the documents stored in the repository. A complete query retrieves all the documents in which a word appears within a given context. In other words, a directory path reflects a query for a set of documents matching a set of constraints. As the path is being incrementally constructed, the user of the file system browses through a set of documents that match a partial query. The user can search or browse the files by encoding queries that result in the generation of paths to the files in the repository. For example, a query may have the form, "/xmlfs/attribute1/value1/ and /attribute2/value2". This query produces a virtual directory that presents all the documents satisfying the condition "attribute1=value1 and attribute2=value2". In another example, the path "/xmlfs/attribute1/value1/ and /attribute2" corresponds to a partial query that produces a virtual directory that presents documents having any possible value of the context attribute2 from the files, satisfying the condition "attribute1=value1".

Figure 5A:
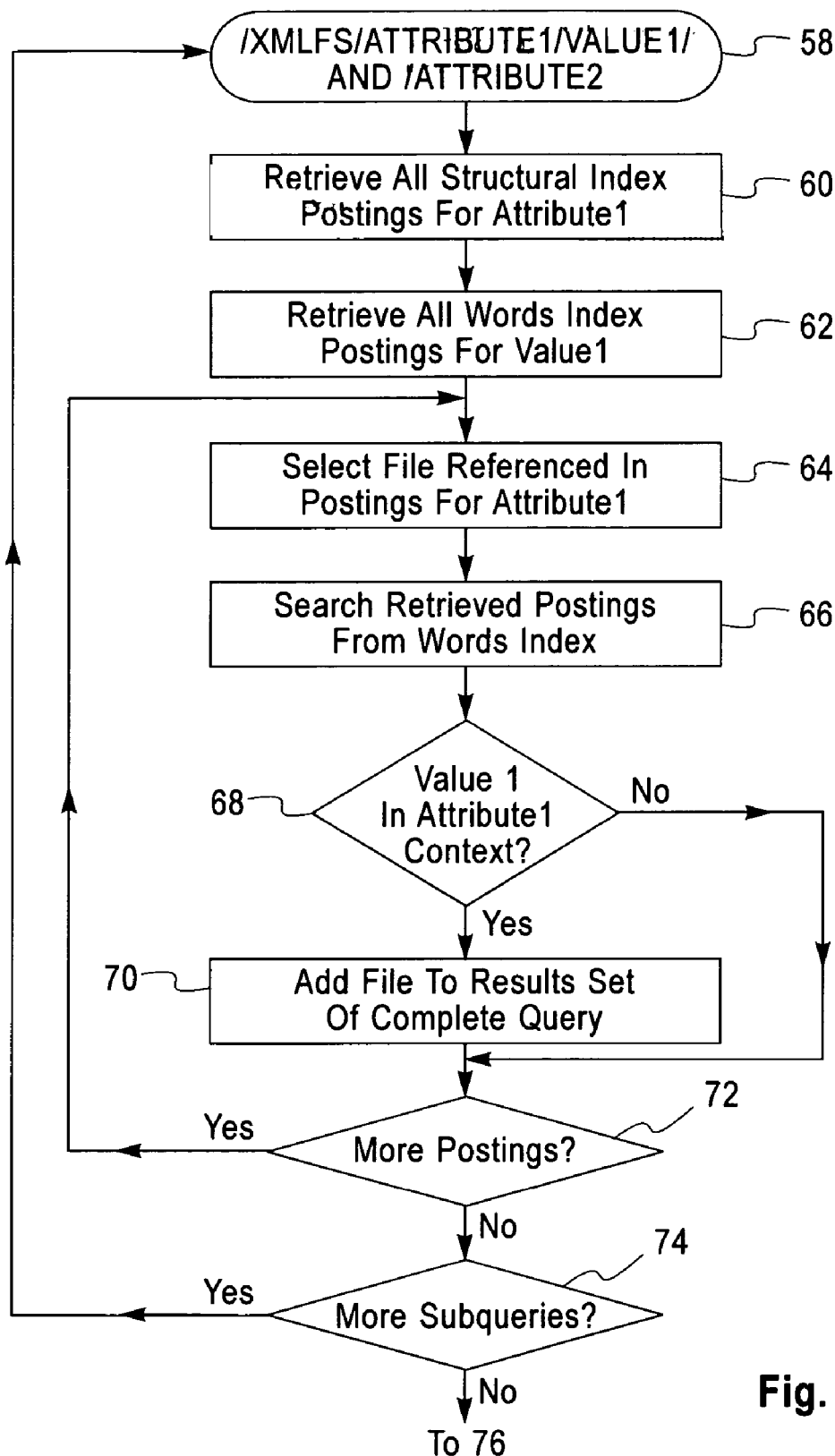
FIGS. 5A–5B, collectively referred to herein as FIG. 5, are a flow chart that illustrates the processing of queries that is employed in the file system shown in FIG. 1 in accordance with a preferred embodiment of the invention.
Figure 5B:
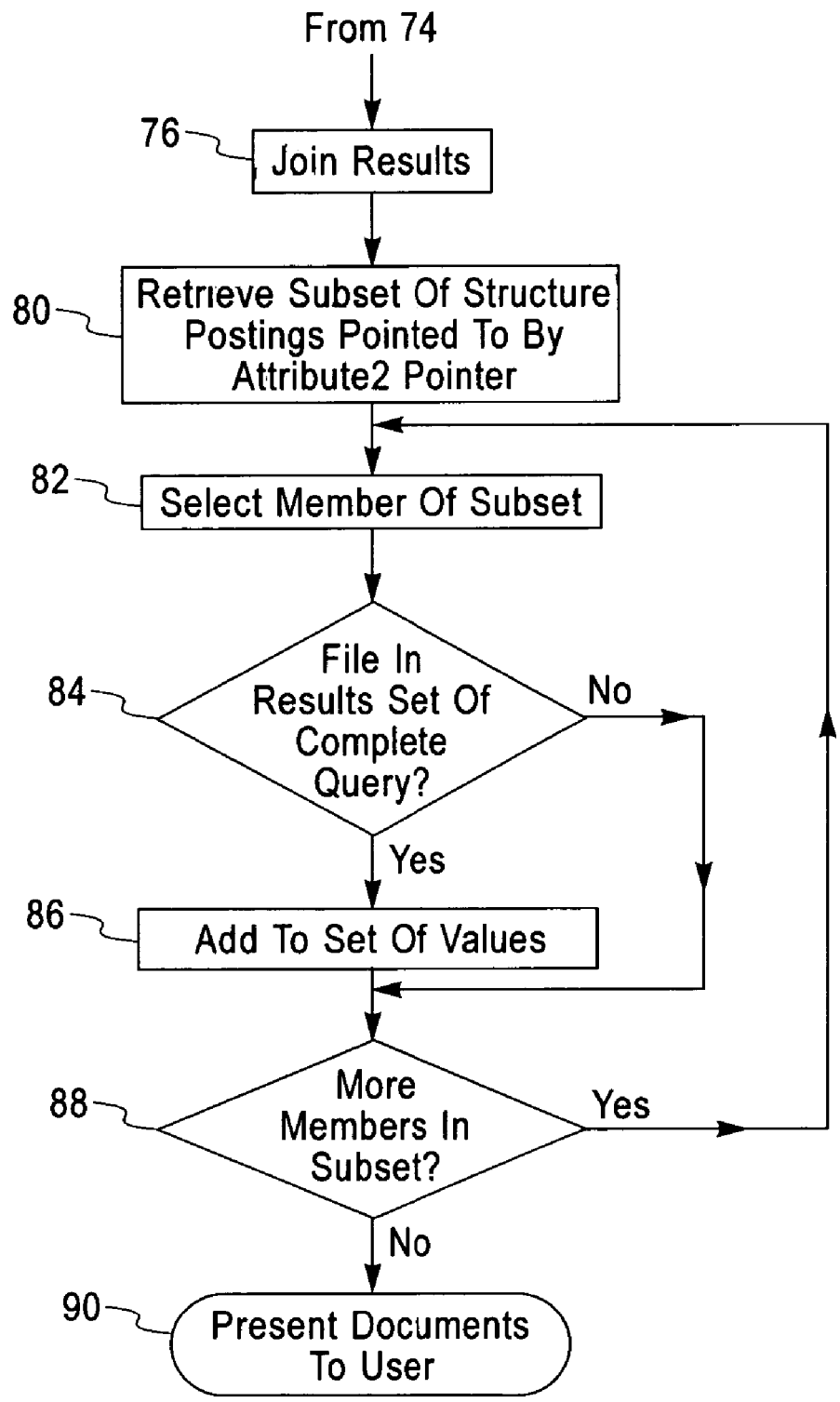

Reference is now made to FIG. 5, which presents a flow chart that illustrates query processing, and is helpful in understanding the index 28 and its components. The description of FIG. 5 is to be read in conjunction with FIGS. 1 and 2. The encoding scheme for the queries indexing process. When other documents having the same DTD are presented to the indexer 20, they merely result in an update of existing entries and postings within the relevant portion of the structural section 30 and the accompanying actual values in the words section 32.

Figure 3:
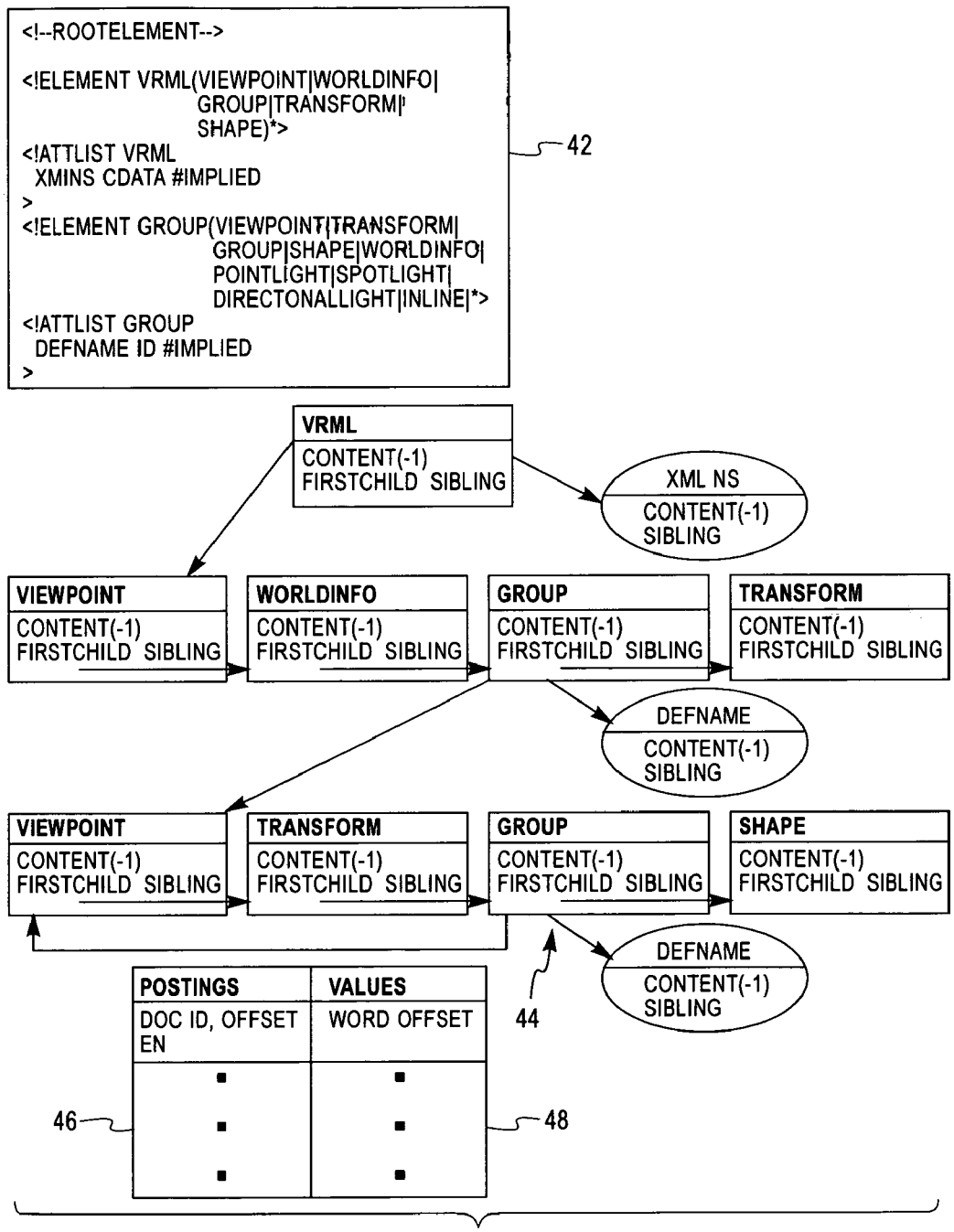
FIG. 3 is a composite diagram that illustrates a simple example of a DTD and a portion of its corresponding structure index in accordance with a preferred embodiment of the invention.

Reference is now made to FIG. 3, which is a composite diagram that illustrates a simple example of a DTD and a portion of its corresponding structure index. The description of FIG. 3 is to be read in conjunction with FIG. 2. The DTD 42 is shown on the upper portion of FIG. 3. The structure index 44 is indicated on the lower portion of the figure. In the structure index 44, elements are indicated by rectangles, and attributes are represented by ellipses. Postings and values lists are shown representatively by the list 46 and the list 48 respectively. Postings and values lists are associated with each element and attribute in the structure index 44.

Figure 4:
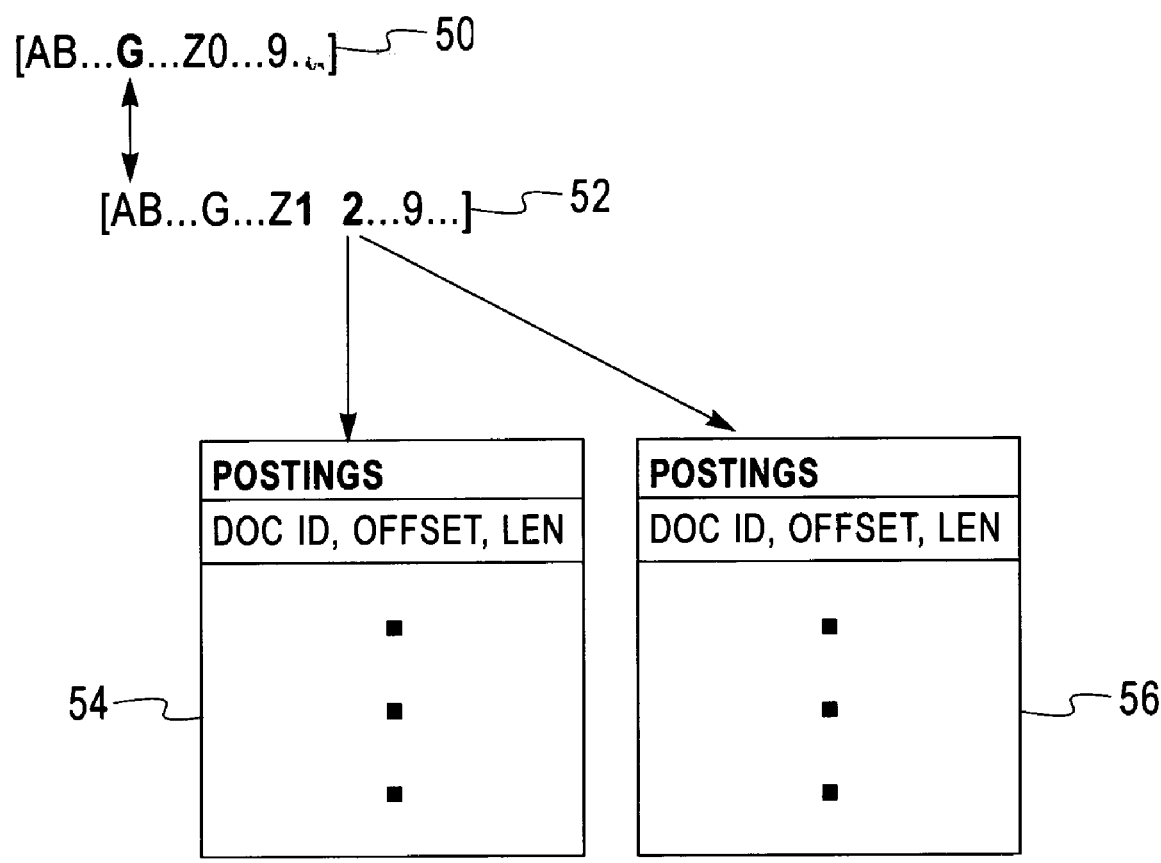
FIG. 4 is a diagram illustrating an example of a words index in accordance with a preferred embodiment of the invention.

Reference is now made to FIG. 4, which illustrates an example of the index in the words section 32 in further detail. The description of FIG. 4 is to be read in conjunction with FIG. 2. The bracketed list 50 and the bracketed list 52 are a portion of a words index that represents the words g1 and g2. In a response to a file addition that includes the words g1 and g2, data extracted from the index that includes the lists 50, 52 would flow to the postings 54, 56, representing indexing entries associated with the words g1 and g2 respectively.

Using the components shown in FIG. 1 and FIG. 2, documents are organized in a dynamic hierarchy, which is constructed on-the-fly. By presenting a dynamic directory structure, the traditional tight coupling between the sets of files and the directory structure is broken, thus allowing different users to see documents organized in a different fashion. Users establish the directory path follows a rule set, which allows the file system engine 24 to recognize which type of query is being posed. A distinction is needed between a call for values and a complete query of a word within a given context.

In initial step 58, a query is stated by the user, for example, "/xmlfs/attribute1/value1/ and /attribute2". The syntax of the example is a path name. The indexer 20, operating on the index 28, must interpret the path name, and translate it into a query. In general, all items preceding the last "and" instance of a query comprise the initial portion of the query. The initial portion comprises one or more complete subqueries. The items following the last "and" instance, comprise the terminal portion of the path name. In any particular query, the terminal portion needs further analysis, since it can be a partial query or a complete query.

If the terminal portion is already known in the index 28, it is interpreted as a request for values of the particular element or attribute. Otherwise, the terminal portion is interpreted as a complete subquery, in which the last element is a word being sought in the context suggested by the initial portion of the last subquery. The term "word", as used herein, is to be broadly construed. For example, a word could be a suitably demarcated alphanumeric string. Other data types could be encompassed within the term "word" as well, for example date fields, or various types of numeric fields. Next complete subqueries are performed. At step 60, all the postings 38 of the context attribute1 are retrieved from the structure index 44. Each of the postings 38 consists of a trio: a XML document identifier, the offset of the context attributed within the file relating to the XML document, and the entry length of the context. At step 62 a subset of the postings 40 that relate to the value value1 are extracted from the words section 32. For convenience of presentation, step 60 and step 62 are shown in sequence. However in practice both the postings 38, 40 may be processed in parallel, either as separate threads on a uniprocessor, or using a multiprocessor.

Next, an evaluation is made of the files that are referenced in the subsets of the postings 38, 40 that were retrieved in step 60 and step 62 respectively. At step 64, a file is selected from the subset of the postings 38. At step 66 a search is made in the subset of the postings 40 in order to determine if any of them refer to the file that was selected in step 64. This is done by evaluating the trio that comprises each of the postings 38, 40. If, for the XML identifier matching the file that was selected in step 64, there is at least one instance in which the offset and length entries for the attribute attribute1 in a member of the subset of the postings 38 match corresponding entries in the subset of the postings 40, then it is determined that the value value1 appears within the context attribute1. This determination is made at decision step 68.

If, at decision step 68, it was determined that the value value1 appears within the context attribute1, the file is added to the results set at step 70. Otherwise control proceeds directly to decision step 72.

All the members of the subset of the postings 38 are processed in the same manner. At decision step 72, a determination is made whether more members of the subset of the postings 38 remain to be processed. If so, then control returns to step 64.

If no more members of the subset of the postings 38 remain, then at decision step 74 it is determined if the query contains more complete subqueries. If so then control returns to initial step 58 to process another query. Otherwise, at step 76 a join operation is performed on the results set obtained in each of the subqueries. If there was only one subquery, then the join operation is omitted. Upon completion of final step 76, there is a list of files, which satisfy all subqueries in the initial portion of the query. In some applications, it may be desirable to process the subqueries in parallel.

Attention is now directed to the terminal portion of the query. In this example, the terminal portion is a partial query, which is a request for values. This is realized in step 80 by extracting another subset of postings 38 in which each member of the subset has a values pointer deriving from the attribute entry attribute2. Each pointer points to a word of the words section 32 and the file in which it appears.

All the members of the subset extracted in step 80 are next examined. At step 82, a member is selected. Then at decision step 84 it is determined if the word pointed to by the values pointer deriving from the attribute entry attribute2 corresponds to a file from the results set obtained in step 76. If so, then at step 86 the value corresponding to the member is added to a set of values to be presented to the user. Otherwise control proceeds to decision step 88.

At decision step 88 it is determined if there are more members of the subset extracted in step 80 to be evaluated. If so control returns to step 82. Otherwise, at final step 90 the set of documents developed in step 86 is presented to the user.

EXAMPLE 1

Figure 6:
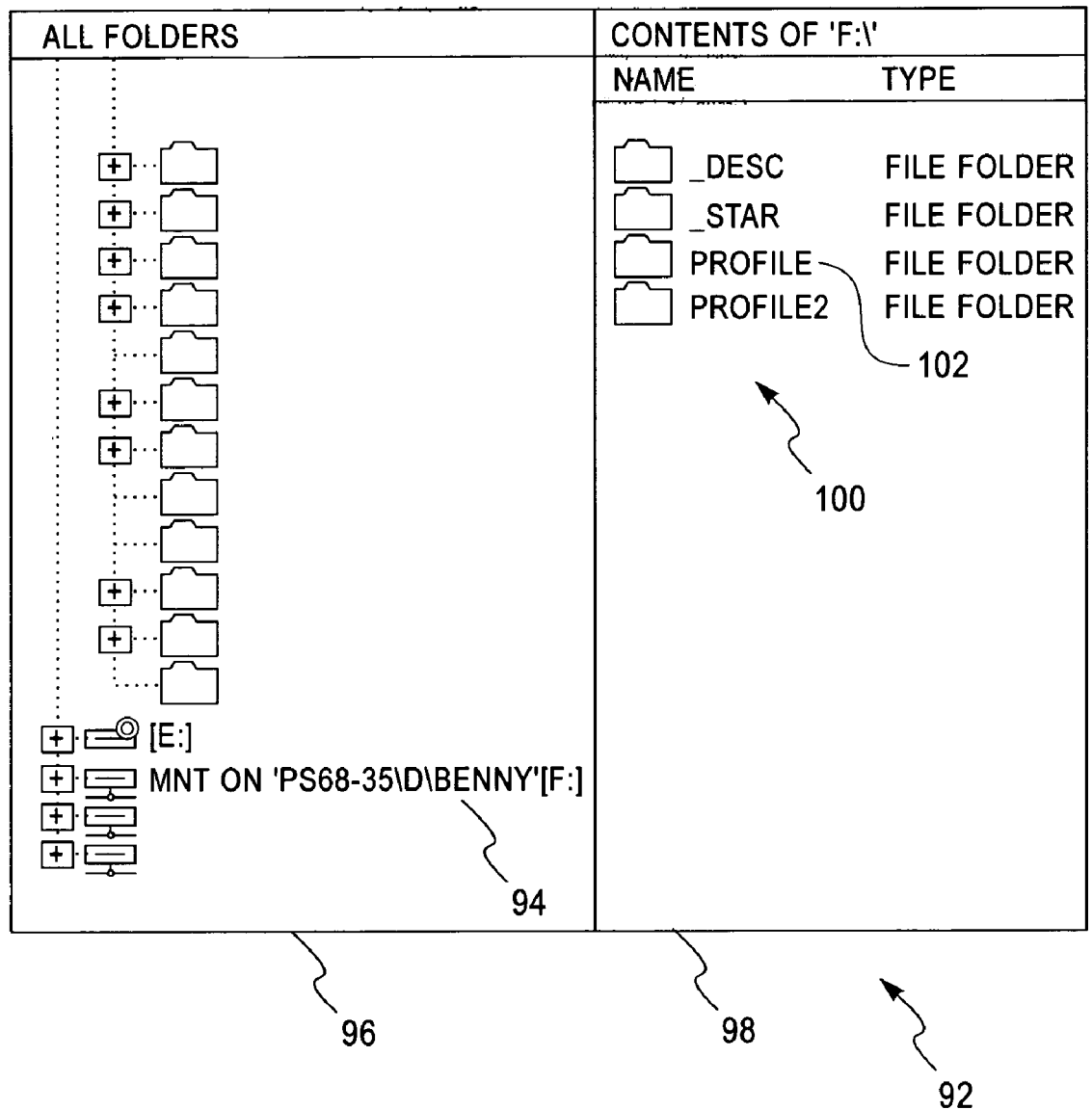
FIG. 6 is a representation of a computer monitor screen display in accordance with a preferred embodiment of the invention.

Reference is now made to FIG. 6, which represents a computer monitor screen display. The description of FIG. 6 is to be read in conjunction with FIGS. 1 and 2. The arrangement 10 is employed in the following example, which excerpts a session in which a user desires to identify all the companies that are listed on the stock exchange mechanism, NASDAQ, using documents that are stored in the file structure 12.

The screen display 92 represents the relevant portion of the output of the well-known Windows Explorer® application of the Microsoft Windows® operating system. The entry 94 of the left panel 96 is a NFS volume that corresponds to the XML repository. The right panel 98 is an expansion of the entry 94, and displays a plurality of file folders 100. The file folders 100 are roots of a virtual hierarchical tree containing the document type declarations of the files that are currently represented in the file structure 12. A particular folder 102, entitled "profile" is one of these roots.

Reference is now made to FIG. 7, which represents a computer monitor screen display. The description of FIG. 7 is to be read in conjunction with FIG. 6. The left panel 104 of the display 106 shows the first level of the expansion of the entry 94, including the folder 102. The right panel 108 of the display 106 shows a plurality of folders 110, which are the expansion of the folder 102. The folder 102 includes the element ticker, represented by the folder 112. The display 106 displays an expanded portion of the document type declarations, which is one level deeper in the hierarchy than the screen display 92. The folder 102 has no values itself, but consists of a plurality of child elements.

Figure 8:
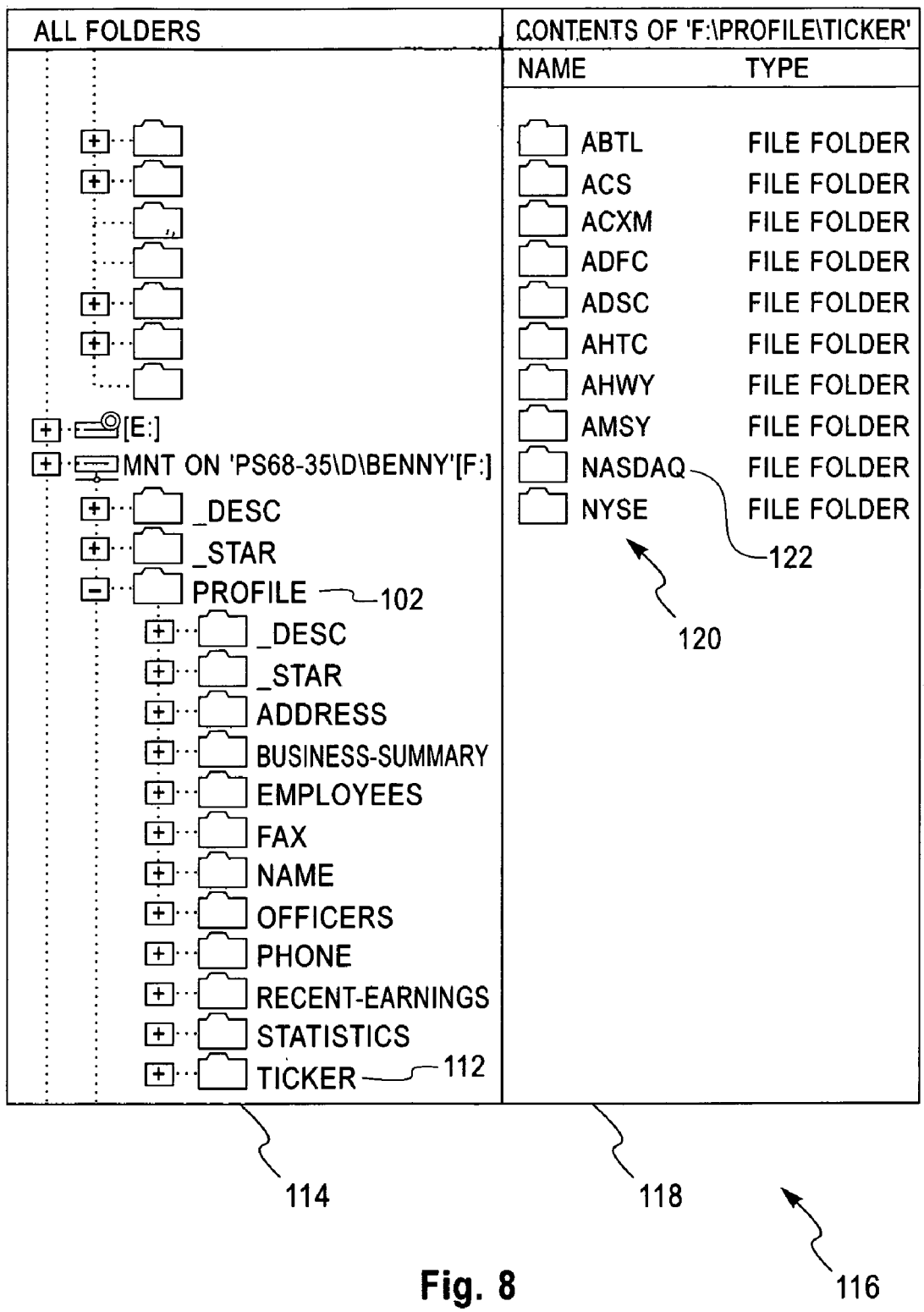
FIG. 8 is a representation of a computer monitor screen display in accordance with a preferred embodiment of the invention.

Reference is now made to FIG. 8, which represents a computer monitor screen display. The description of FIG. 8 is to be read in conjunction with FIG. 6 and FIG. 7. The left panel 114 of the display 116 now shows an expansion of the folder 102, including the element ticker represented by the folder 112. The right panel 118 of the display 116 shows a plurality of folders 120, which are the expansion of the folder 112, including the element Nasdaq, represented by the folder 122. The display 116 thus presents the result of expanding the element ticker. The folders 120 contain files having actual values of the element /profile/ticker from the files stored in the repository. The result that is presented to the user is derived from all values subsumed below the element ticker satisfying the query.

Figure 9:
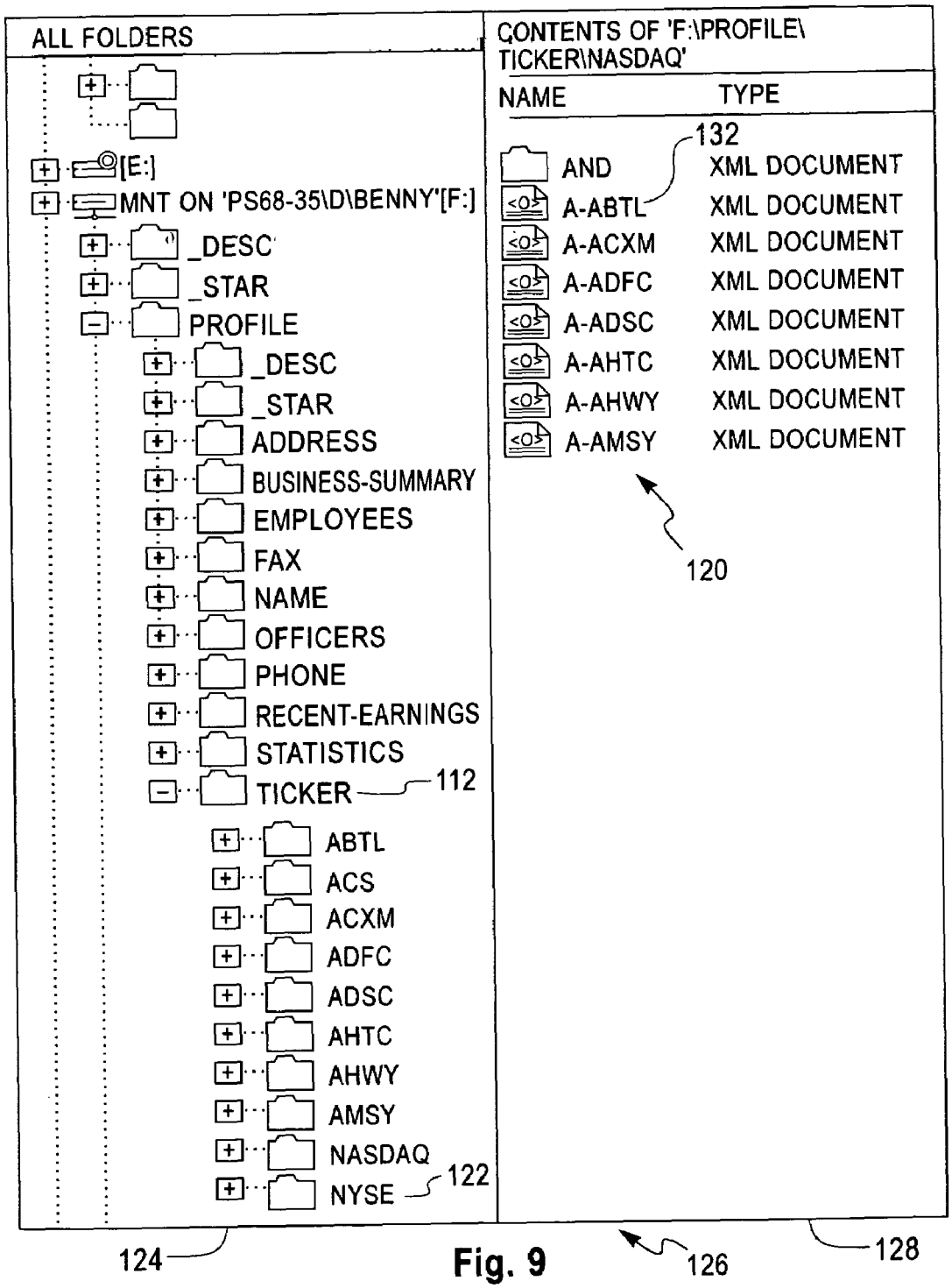
FIG. 9 is a representation of a computer monitor screen display in accordance with a preferred embodiment of the invention.

Reference is now made to FIG. 9, which represents a computer monitor screen display. The description of FIG. 9 is to be read in conjunction with FIG. 6, FIG. 7, and FIG. 8. The left panel 124 of the display 126 shows an expansion of the folder 112, including the folder 122. The right panel 128 of the display 126 shows a plurality of documents 130, which are the expansion of the folder 122, including the document 132. The display 126 thus presents the result of expanding the element Nasdaq. In the right panel 128, the user is presented with all the files which have the word nasdaq in the context /profile/ticker.

Reference is now made to FIG. 10, which represents a computer monitor screen display. The description of FIG. 10 is to be read in conjunction with FIGS. 6, 7, 8, and 9. The display 134 comprises a portion of the text of the document 132, and includes the string 136, having the value Nasdaq. The display 134 is a particular example of a document satisfying the user's query, which can be quickly accessed using the Windows Explorer application of the Microsoft Windows operating system.

ALTERNATE EMBODIMENT

In an alternate embodiment of the invention, the XML-aware file system disclosed above is modified in order to permit the extraction of information from a federated repository including many different sources having disparate formats, each source installed in a client having its own directory structure. Navigation through the repository is accomplished in an intuitive and unified manner by providing a "file system union". The file system union is a taxonomy union of all distinct taxonomies residing on separate repositories, either on one machine, or distributed among many machines.

The file system union is achieved by merging a plurality of repository indices. This is done in a deep fashion in which elements in the index structure that represent identical entries are fused, rather than being displayed side-by-side.

Each participating site develops a local semantic index, also referred to herein as a repository index, as disclosed in the discussion of the first embodiment. This local index is built by each client of the distributed system. Each such index supplies all the needed information regarding the files on that specific site. These individual indices are then unified in order to enable global navigation through all available information. The combined index changes dynamically, at any time only represents information originating in sources that are currently accessible.

In order to understand how to create a unified taxonomy that supports browsing in heterogeneous data sources, it is necessary to appreciate where such a shared taxonomy originates. Two separate cases can be distinguished.

In a first and simpler case, related documents adhere to the same metamodel. For example, related XML documents that reside in separate repositories may adhere to the same document type definition. The navigation paradigm according to the invention relies on the documents' structure. As the structure of each document is similar, documents from different repositories seamlessly merge into the same virtual hierarchical structure, and any of the architectures disclosed herein readily support a fused common directory structure from different sources.

In a second, more complex case, related documents have different structures. For example, related XML documents that reside in separate repositories have different document type definitions. The second case can present itself in different ways:

In a first presentation of the second case, different names or different structures in different document type definitions have a common semantic meaning. For example, one structure can contain a semantic element named 'author' while another structure refers to this element as 'writer'.

In a second presentation of the second case, the same element name has a different semantic meaning in different structures. This represents a more complicated situation, which requires a mapping in order to achieve a meaningful presentation to the end-user. Such a mapping can be constructed using existing XML transformation creation tools. The original structures are converted into new ones in which semantically similar tags will reside together. In order to accomplish the mapping, the specific data sources and their respective formats must be known in advance, and corresponding analysis on the structure of the different formats is also required. Thus, in one data source, documents may have a XML format, while in another source, they may have an entirely different format and not follow XML conventions. It is assumed that the documents in the data sources are at least semi-structured documents. A transformation, either a transformation according to the well-known Xpath language for addressing parts of a XML document, or a variant of a Xpath transformation, is performed on the data sources in order to unify them semantically. Other methods of transforming documents from a non-XML source to a structure similar to XML are known, and can be used to prepare indices. The original documents themselves are stored without modification, but for the purpose of indexing, both transformed documents and original documents may be used.

It is believed that the first case will become common, because much of the power of XML relies on the use of identical structures. It is to be expected that each industry segment will converge around a single set of document type definitions, which will be used uniformly. Mapping will not often be required, as it is anticipated that a relatively small set of document type definitions, will be encountered. A mapping itself only needs to be created on a server once per structure.

Figure 11:
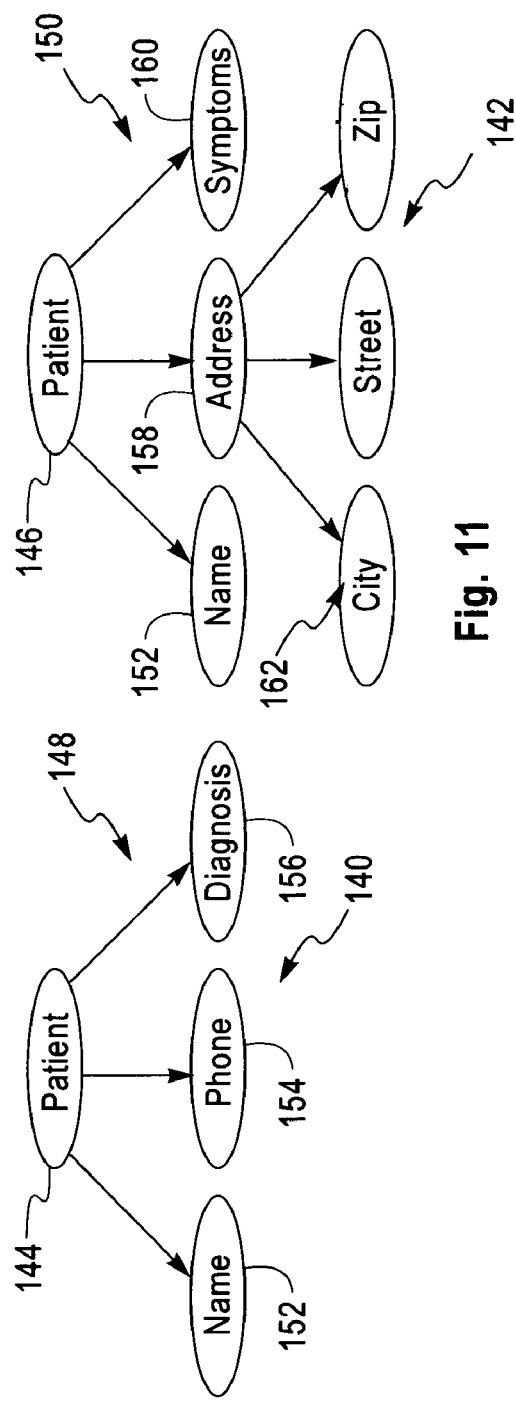
FIG. 11 is a representation of information taken from two different directory structures, based on different file types, in which attributes and values are represented as hierarchical trees in accordance with a preferred embodiment of the invention.

Fusion of two indices can be appreciated initially with reference to FIG. 11, which is a representation of information taken from two different directory structures based on different file types, in which attributes and values are represented as hierarchical trees 140, 142. Both of the hierarchical trees 140, 142 have a common root element, indicated by an element patient 144 and an element patient 146. Different reference numerals are shown in order to emphasize that while the attribute is common, the hierarchical trees 140, 142 represent two different individuals. The next lower layers 148, 150 share a common element Name 152, but an element phone 154 and an element diagnosis 156 of the layer 148 differ from an element address 158 and an element symptoms 160 of the corresponding layer 150. The hierarchical tree 142 has a lowermost layer 162 that is lacking in the hierarchical tree 140.

Figure 12:
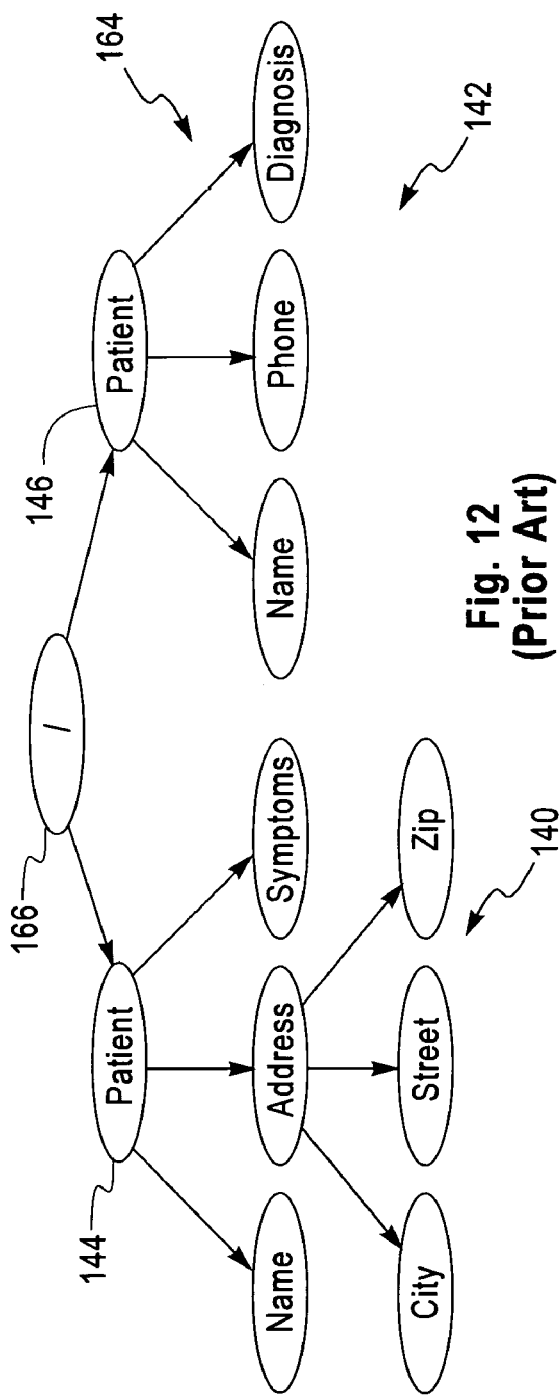
FIG. 12 illustrates a hierarchical tree representing a combination of the hierarchical trees shown in FIG. 11 in accordance with the prior art.

Reference is now made to FIG. 12, which illustrates a hierarchical tree 164 representing a combination of the hierarchical trees 140, 142 (FIG. 11) achieved by conventional distributed file systems. The hierarchical tree 164 has a root element 166 which links the hierarchical trees 140, 142, both of which retain their original structures, and are identifiable as branches in the hierarchical tree 164.

Figure 13:
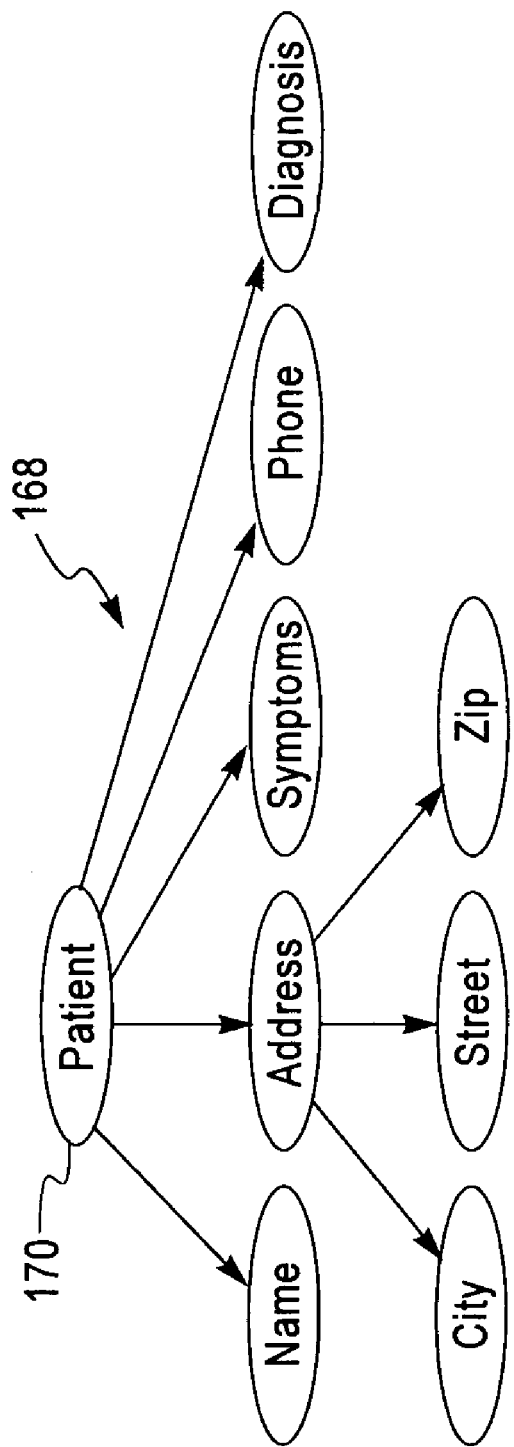
FIG. 13 illustrates a hierarchical tree representing a combination of the hierarchical trees shown in FIG. 11 in accordance with a preferred embodiment of the invention.

Reference is now made to FIG. 13, which illustrates a hierarchical tree 168 that is a combination of the hierarchical trees 140, 142 in accordance with the invention, using the techniques disclosed in the discussion of the first embodiment herein. The original hierarchical trees 140, 142 are no longer distinguishable, and elements having attributes common to the two trees are fused into a new element having the same attribute. For example, the element patient 144 and the element patient 146 no longer exist. Instead, an element patient 170 is present, and is an index entry pointing to information for both the element patient 144 and the element patient 146.

Master Index.

Continuing to refer to FIG. 13, the fused index indicated by the hierarchical tree 168 is prepared by receiving a plurality of individual indices for different data sources. An indexing technique is then applied to the plurality of individual indices to create a multidimensional or multilevel master index, which is a logical meta-index representing a merger of the individual indices. The indexing techniques disclosed with respect to the first embodiment are suitable for the preparation of the master index. Referring again to FIG. 4, it is necessary to modify the document identification element of the postings 54, 56 to indicate the data source or computer of origin for each indexed document, and to include the index name, which is typically a file system mount point. Preferably, a master index is organized as a tree structure, which is a forest of indices. Dynamic additions and deletions are accomplished using standard tree manipulation algorithms. Alternatively, the master index may be constructed as a sorted list.

Upon arrival of a new index at the central server, it is first determined whether that specific index already exists in the master index. In case it does, the process is treated as an index refresh operation. In a first state, the old version of individual index is deleted. In a second stage, a new child entry is created under the meta-index root, and the newly received index is associated with the newly created child. Queries are processed by inspecting each individual index of the master index, a task that can be done in parallel, followed by merging the results based on designated ranking characteristics.

Deletion of a specific index from the master index is performed simply by erasing the link to the individual index from the central index's root. Such a deletion can stem from a client's request to delete its index or an indication from another component in the federation that the server holding the index in question is no longer responding.

Figure 14:
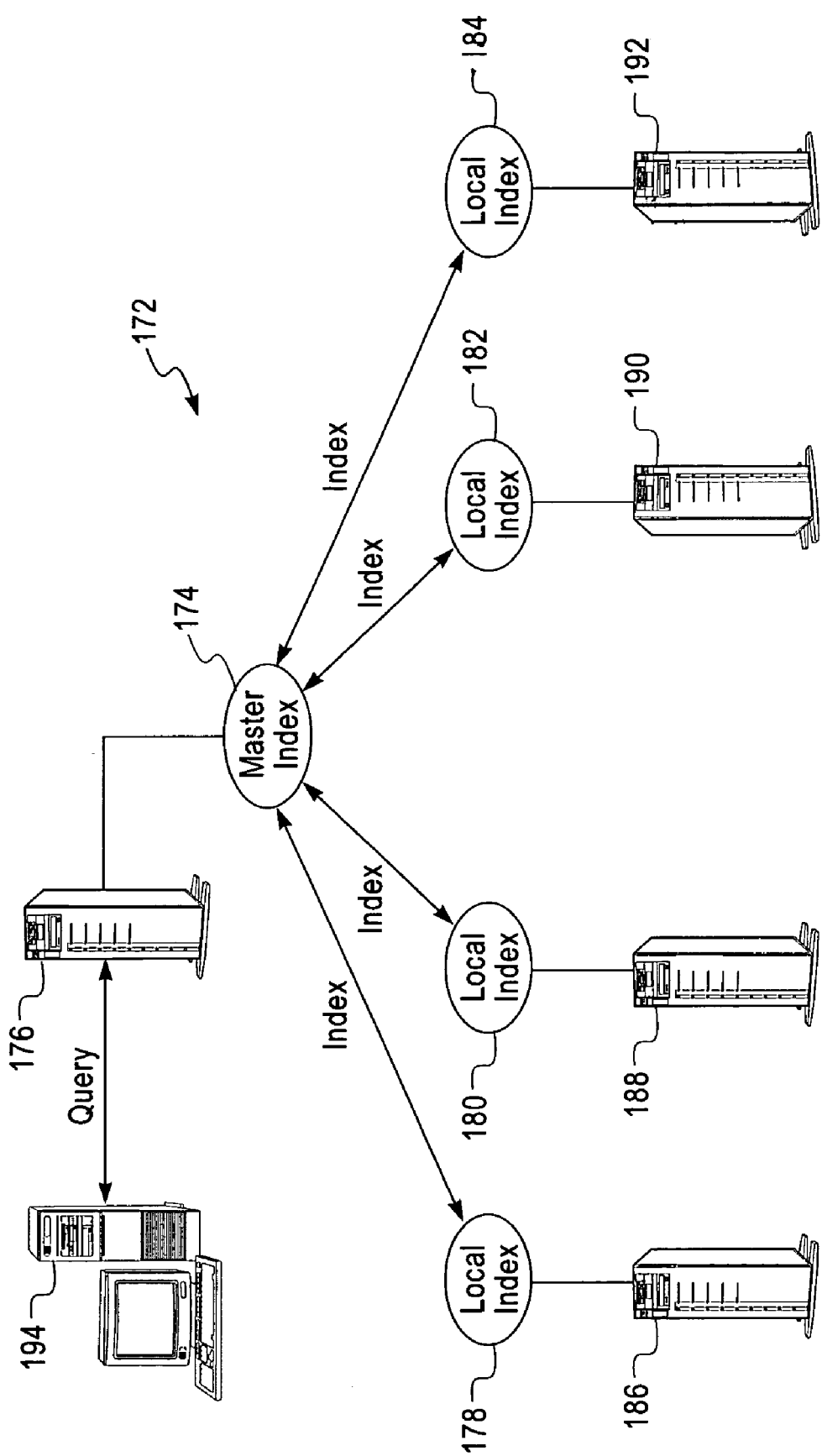
FIG. 14 is a block diagram of an index architecture in accordance with a preferred embodiment of the invention.

A spectrum of architectures based on the local indexes is possible. Reference is now made to FIG. 14, which is a block diagram of an index architecture at one end of the spectrum in accordance with a preferred embodiment of the invention. A hierarchy 172 forms a tree structure. A single master index 174 may be stored in a central server 176, which maintains an index for the complete collection of files. A system of local indices 178, 180, 182, 184, maintained on the same or different servers, is currently accessible to the master index 174. The local indices 178, 180, 182, 184 are maintained by respective clients 186, 188, 190, 192, which hold data sources of the federated repository. Links between objects, indicated by double arrows, have the notations "query" and "index" associated therewith, indicating that queries and indices are communicated on the respective links. The links are typically links across a data network, for example the Internet.

Each of the clients 186, 188, 190, 192 in the federated repository generates a current version of its respective one of the local indices 178, 180, 182, 184, and sends it to the central server 176, which then merges the individual local indices 178, 180, 182, 184 into the master index 174. The central server 176, functioning as a query manager, is then capable of responding to queries from an end-user 194. The queries are global within the local indices 178, 180, 182, 184. Updates of the local indices 178, 180, 182, 184 are required to be transferred to the central server 176 in order to maintain currency of the master index 174. This architecture is similar to Napster's model.

Figure 15:
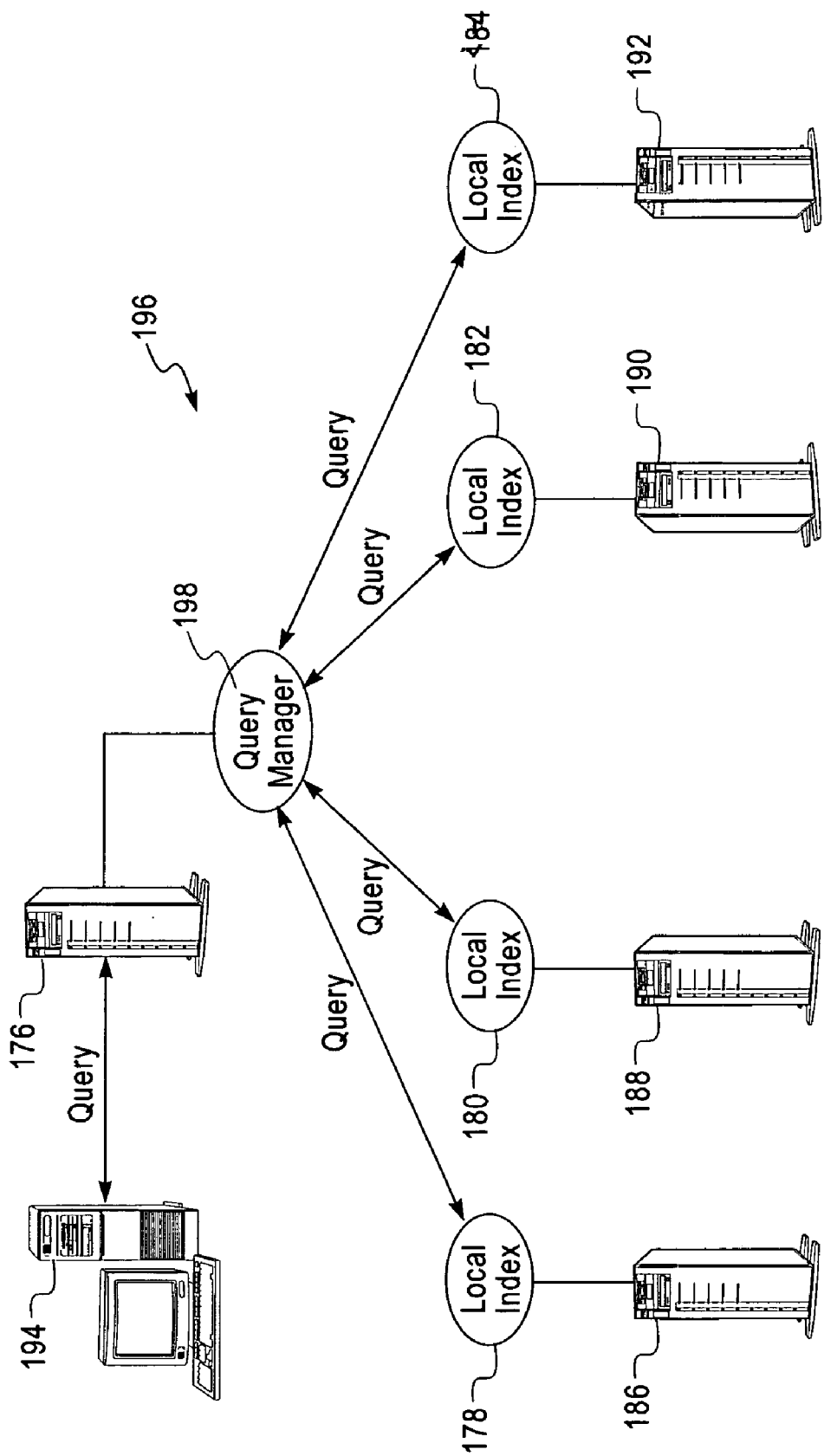
FIG. 15 is a block diagram of an index architecture in accordance with an alternate embodiment of the invention.

Reference is now made to FIG. 15, which is a block diagram of an index architecture representing the other end of the spectrum in accordance with an alternate embodiment of the invention. The symbols in FIG. 15 have the same meaning as in FIG. 14, and like elements are given like reference numerals. In this architecture, a hierarchy 196 forms a tree structure similar to the hierarchy 172 (FIG. 14). But now, the master index 174 has been replaced by a central query manager 198, which distributes queries from the end-user 194 to the clients 186, 188, 190, 192. In this architecture, the local indices 178, 180, 182, 184 are maintained as in the hierarchy 172 (FIG. 14), but the local indices are not communicated to the query manager 198. Instead each of the clients 186, 188, 190, 192 receives a copy of the query of the end-user 194 via the query manager 198, and consults its respective one of the local indices 178, 180, 182, 184 in order to respond to the query. The results are returned to the query manager 198. The query manager 198 then merges the individual query results and prepares a consolidated display for the end-user 194, using the same techniques for displaying information as are disclosed above with respect to the first embodiment. While the clients 186, 188, 190, 192 are not burdened with responsibility for transmitting updated versions of their respective local indices, they are still responsible for registering and deregistering their availability with the query manager 198.

Figure 16:
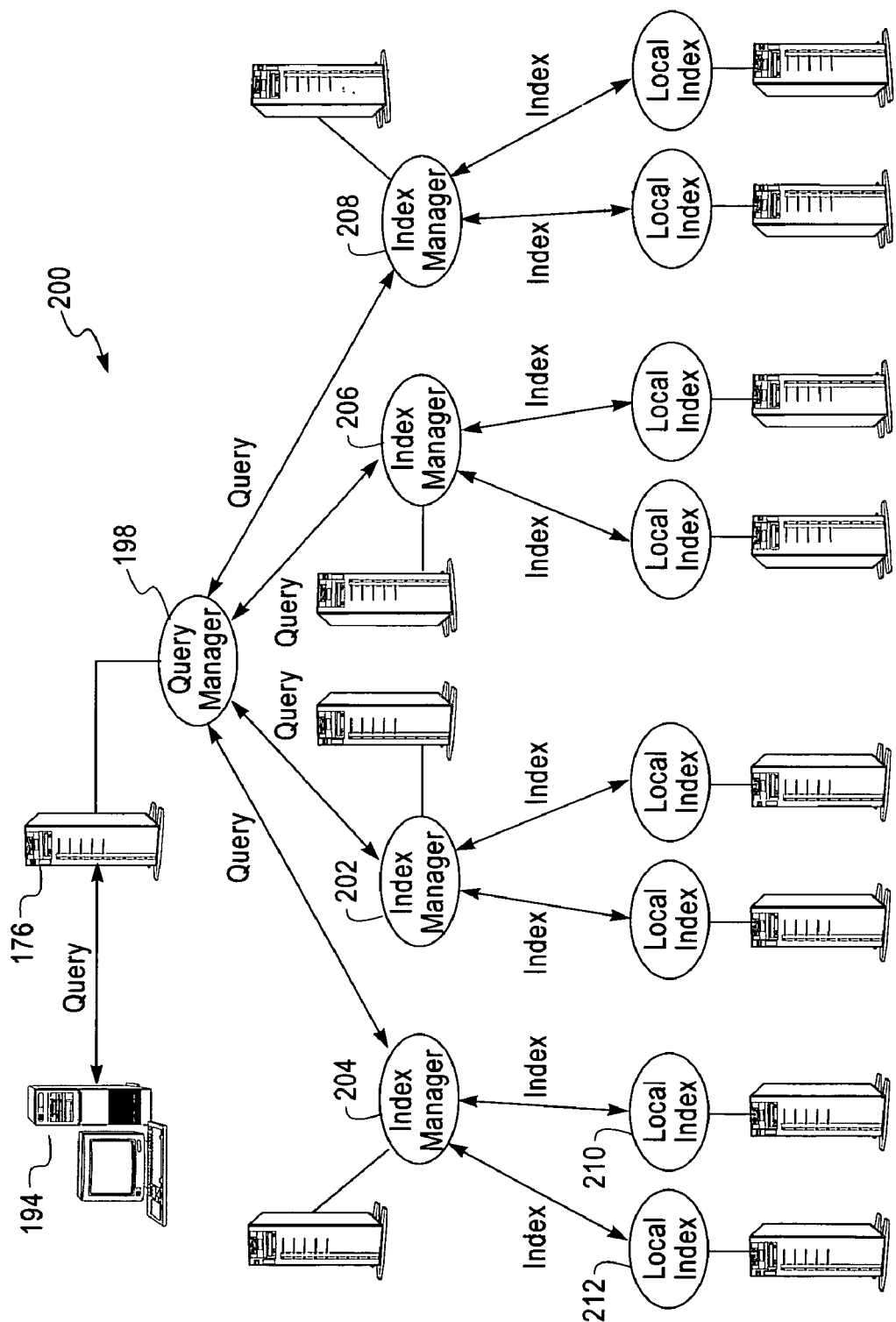
FIG. 16 is a block diagram of an index architecture in accordance with an alternate embodiment of the invention.

Hybrid versions of the two above-disclosed architectures can be used. Reference is now made to FIG. 16, which is a block diagram of a hierarchy 200 in accordance with an alternate embodiment of the invention. The description of FIG. 16 should be read in conjunction with FIG. 14 and FIG. 15, in which like elements are given like reference numerals and like symbols have the like meanings. The hierarchy 200 includes the query manager 198 and a layer of subordinate index managers 202, 204, 206, 208. Only one level of index managers is shown in FIG. 16; however, an arbitrary number of levels of subordinate index managers may be provided as required. Each of the index managers 202, 204, 206, 208 is responsible for a subset of clients in the federated repository. Thus, the index manager 202 collects and merges local indices 210, 212, for which it is responsible. It will be noted that queries and results are communicated on the links connecting the query manager 198 and the index managers 202, 204, 206, 208. Indices are communicated on the links connecting the index managers 202, 204, 206, 208 and the local indices, for example, the links connecting the index manager 202 and the local indices 210, 212.

Queries are sent from the end-user 194 to the query manager 198, which distributes the queries to the index managers 202, 204, 206, 208. Query responses are prepared by the index managers 202, 204, 206, 208, and are then submitted to the next higher level, which in FIG. 16 is the query manager 198. The query manager 198 then merges the results.

In all variants of the architectures represented by FIG. 14, FIG. 15, and FIG. 16, queries are not required to be passed through the query manager 198. Knowledgeable users may alternatively direct queries to lower levels of the hierarchy, either to the index managers, or directly to the clients themselves.

In preparing a master index, or a merged response to a query, in the case of a distributed indexing architecture, duplicate documents may be encountered in different data sources of the federated repository. This may be dealt with using any of several policies. For example, if a document appears in different indices, all the different occurrences may be returned to the user for him to choose whichever copy he favors. Alternatively, the duplicates may be all be indexed, and one of them marked as an active or principal replica. The system may employ an arbitration technique to determine which of several documents is to be treated as the principal replica for purposes of retrieval. Arbitration can be based on various performance factors, for example server response time, or bandwidth. In some circumstances, it may be possible to improve throughput by retrieving different portions of a duplicated document from different data sources.

If the files of the federated repository contain XML-encoded data, the attributes and values can be derived automatically from the files contents, as with XMLFS. Predefined filters can also be employed to extract the attributes and values from non-XML files, as suggested by the above-noted article, *Semantic File Systems*.

The master index is used to determine whether requested data exists, as well as for actually locating the data. Once a user locates an interesting file, it is transferred to him directly from the client on which it actually resides. This approach eliminates any intermediate servers or other mediators, which could constitute artificial barriers to information sharing between a content provider and the consumer. Migration of data sources is facilitated, since users do not connect directly to the physical location of the documents but receive them indirectly through the query manager or master index. Thus when a file system needs to be migrated from one server to another, only one master pointer, found in a central location in any of the architectures, needs to be changed.

Operation.

Figure 17A:
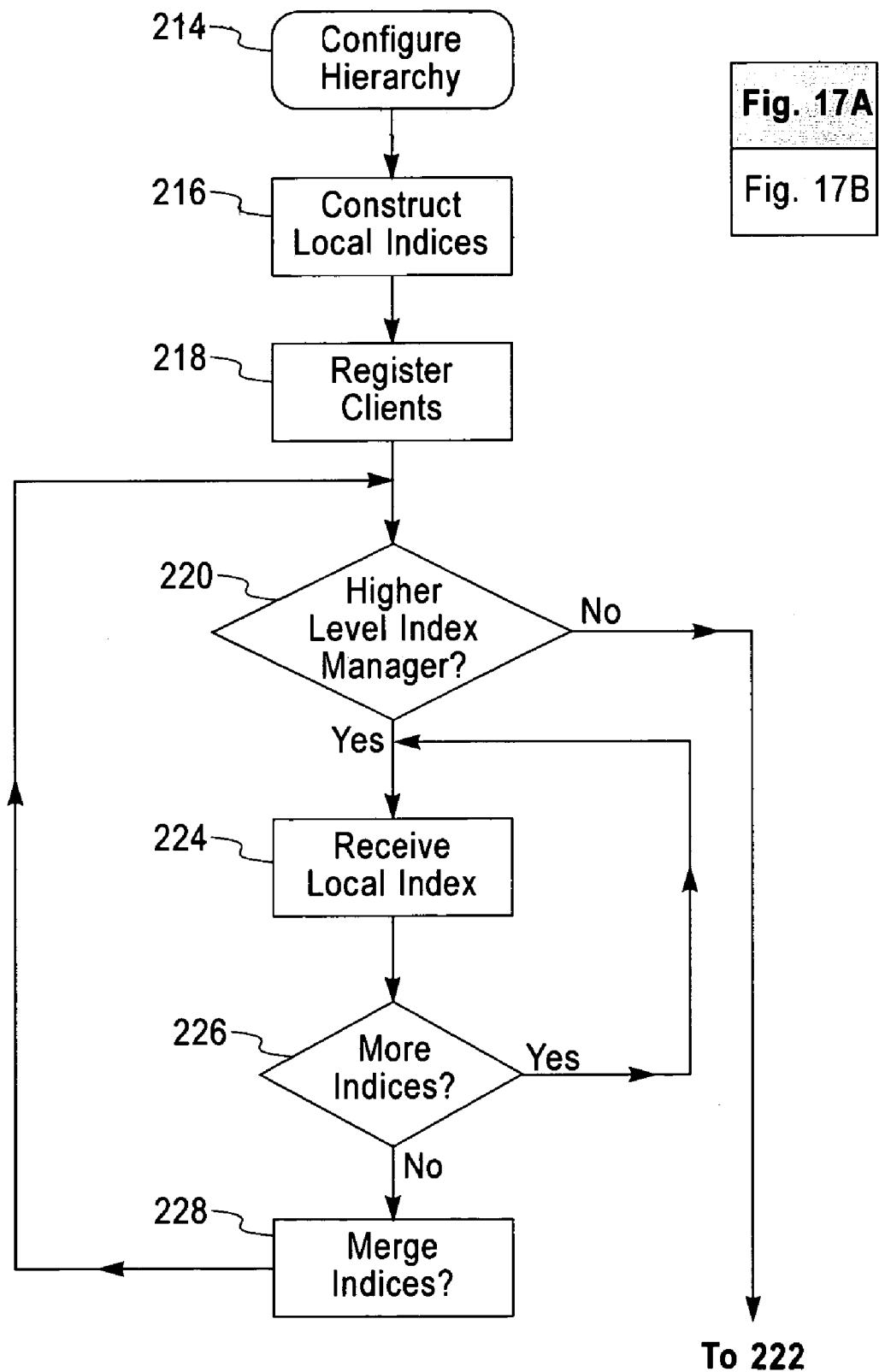
FIG. 17A and FIG. 17B, collectively referred to herein as FIG. 17, are a flow chart illustrating a method of obtaining information from a federated repository in accordance with an alternate embodiment of the invention.
Figure 17B:
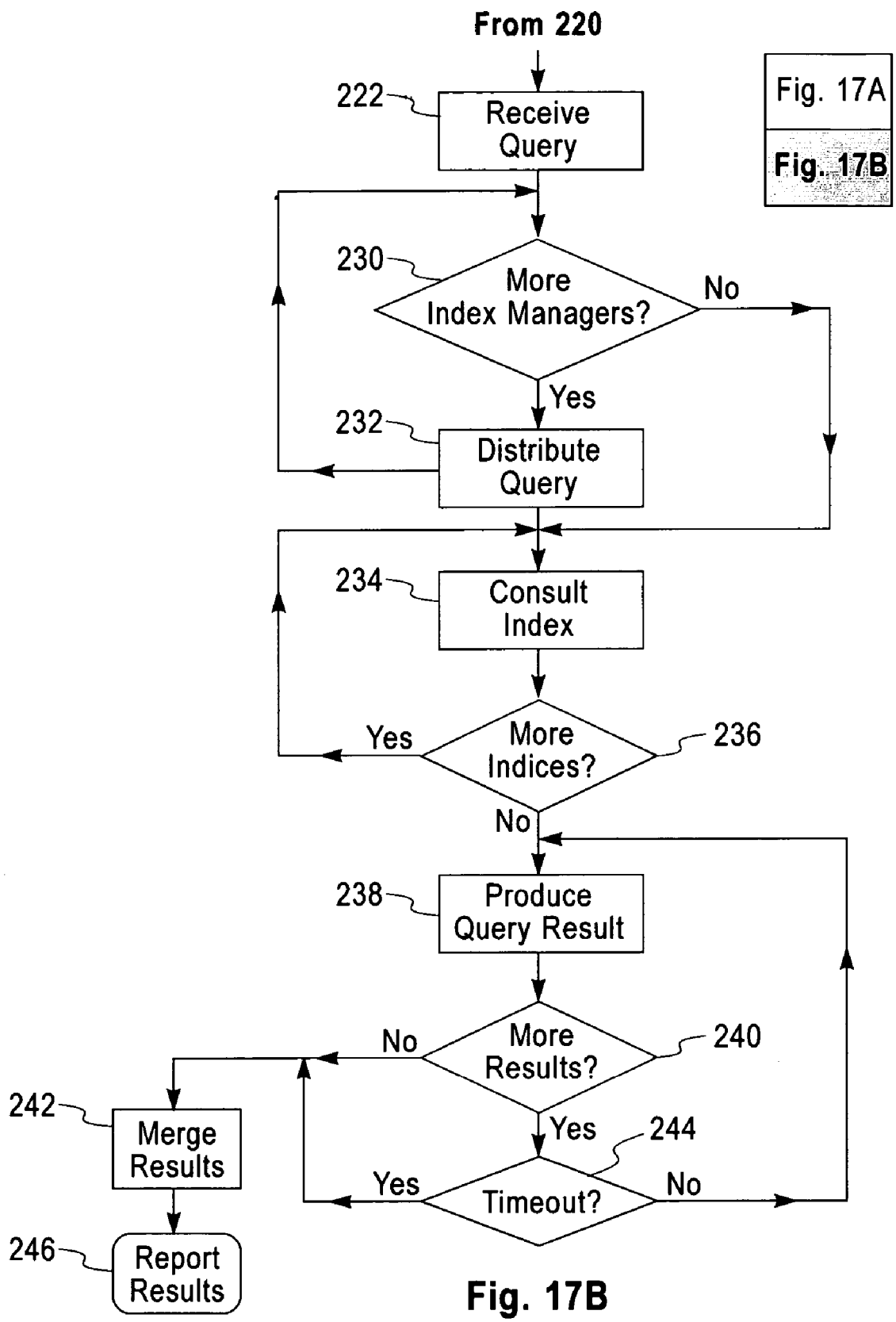

Reference is now made to FIG. 17, which is a flow chart illustrating a method of obtaining information from a federated repository according to an alternate embodiment of the invention. The steps of the method are shown in an exemplary order, but may be carried out in many different orders. Some steps may be conveniently performed in parallel. The process begins at initial step 214. Here one or more index managers and query managers are configured in a data network. The data network may comprise any of the hierarchical architectures disclosed with respect to FIG. 14, FIG. 15, or FIG. 16. Indeed, in some cases the hierarchy can be configured dynamically, in accordance with changing network conditions, such as load balancing requirements, variation in regional response times, and packet losses in various portions of the data network.

Clients within a federated repository are responsible to register themselves as being available to queries. This process begins by the preparation of updated local semantic indices by clients for their respective data sources. At step 216, each client prepares a local semantic index. The clients typically accomplish this independently. The client pool varies dynamically, and although step 216 is indicated as part of a sequence of steps, it will be understood that as the composition of the client pool changes, the various steps of FIG. 17 relating to the recognition and management of the client pool are also performed asynchronously.

Control proceeds to step 218, where each of the clients communicates a message to the next highest level of the hierarchy that was established at initial step 214 that it is on-line. The client pool is not predetermined. The number and hierarchical arrangement of index managers is flexible. Thus, a large client pool may require a relatively large number of index managers, and when a threshold is crossed, the index managers are automatically reorganized in a multilevel hierarchy. In step 218, during the client registration process, a determination is made whether each client is to be appointed as an index manager and at which hierarchical level. Links within the hierarchy of index managers are adjusted dynamically as the client pool grows or shrinks. Typically, the first few clients to join the pool are appointed as index managers, while latecomers are not accorded this responsibility.

When a new client registers or leaves the client pool the query manager 198 obtains the updated registration information and is responsible for adjusting hierarchy of clients and index managers accordingly Next, at decision step 220, as part of the client registration process, a determination is made if the indices prepared by the clients at step 216, need to be communicated to an index manager at a higher level of the hierarchy that was established at initial step 214. In the cases of the architectures disclosed with reference to FIG. 14 and FIG. 16 there is a higher-level index manager. In the case of the architecture disclosed with reference to FIG. 15, the clients themselves receive copies of queries, and consultation of the indices is performed at the lowest level of the hierarchy.

If the determination at decision step 220 is negative, then control proceeds to step 222, which is disclosed below.

If the determination at decision step 220 is affirmative, then control proceeds to step 224, where a higher-level index manager receives a local index from a client.

Next, at decision step 226 a determination is made whether more indices need to be received by the index manager noted in step 224. If the determination at decision step 226 is affirmative, then control returns to step 224.

If the determination at decision step 226 is negative, then control proceeds to step 228, where all the indices received by a particular index manager in step 224 are merged. Control then returns to decision step 220.

It will be appreciated from a consideration of the hierarchy 200 (FIG. 16) that the sequence of steps comprising decision step 220, step 224, decision step 226, and step 228 are performed iteratively within one level of the hierarchy. However, in a hierarchy in which two or more levels of index managers occur, then the sequence must be repeated for each level of index managers, in which case a subordinate index manager plays the role of the client. A recursive implementation of the sequence may be convenient in the case of a computer implementation of a multilevel hierarchy of index managers.

Step 222 is performed if the determination at decision step 220 is negative. The indices of the federated repository are now established, and management responsibilities for index management are assigned. A query is now received from a user.

As explained above, a query could avoid the index managers entirely, in which case decision step 230 and step 232, which are now disclosed, would be omitted. At decision step 230 a test is made to determine if the query received at step 222 needs to be distributed to a subordinate index manager. In the case of the architecture disclosed with respect to FIG. 14, if the recipient of the query is itself the master index manager, then no further distribution is necessary. In the case of the architecture disclosed with respect to FIG. 15, the recipient of the query is a query manager. The clients themselves function as index managers, and the query needs to be distributed to each of them. In the case of architecture disclosed with respect to FIG. 16, regional index managers occur at a lower level of the hierarchy than the query manager. Each of them needs to receive a copy of the query.

If the determination at decision step 230 is affirmative, then control proceeds to step 232. The query is distributed to an index manager by the query manager. Control then returns to decision step 230.

If the determination at decision step 230 is negative, then control proceeds to step 234. Here a local index or a merged index is consulted by a client or by a higher-level index manager in regard to the query.

Next, at decision step 236 a determination is made whether more local indices or merged indices remain to be consulted. If the determination at decision step 236 is affirmative, then control returns to step 234.

If the determination at decision step 236 is negative, then control proceeds to step 238. A query result is reported from each index manager to the element from which the query was received in step 232.

Control now proceeds to decision step 240 where it is determined if more query results are expected from index managers lower in the hierarchy. Where the recipient of the query is itself the master index manager (FIG. 14) this is never the case.

If the determination at decision step 240 is negative, then control proceeds to step 242, which is disclosed below.

If the determination at decision step 240 is affirmative, then control proceeds to decision step 244, where it is determined if a predetermined time interval has elapsed. This time interval is established in order that the operation of the system not be delayed if one or more clients or index managers are slow to respond or otherwise disabled.

If the determination at decision step 244 is negative, then control returns to step 238.

If the determination at decision step 244 is affirmative, then control proceeds to step 242.

At step 242, results are merged if they have been received from more than one index manager in step 238. Where the recipient of the query is itself the master index manager (FIG. 14), it is not necessary to merge results.

Control now proceeds to final step 246. The final query result is sent to the end-user who submitted it, and the process ends.

EXAMPLE 2

Assume that Fred wants to share files f1 and f2 that have sets of <attribute, values> as shown in Listing 1. These files reside on a machine called Fred in directories called /home/fred/public/music/beatles/f1, and /home/fred/public/music/rock/general/f2:

Listing 1 f1: {<artist, "beatles">, <title, "revolution">, <year, 1967>}
f2: {<artist, "rolling stones">, <title, "satisfaction">, <year, 1967>}.

John has files j1 and j2 which reside on a machine called John in directories called d:\john\stuff\songs\j1 and d:\john\stuff\songs\j2 as shown in Listing 2.

Listing 2 j1: {<artist, "beatles">, <title, "love me do">, <year, 1962>}
j2: {<artist, "eric clapton">, <title, "i shot the sheriff">, <year, 1967>}

Mary has files m1 and m2 which reside on a machine called Mary in directories called: d:\m1 and c:\system32\m2 as shown in Listing 3.

Listing 3 m1: {<artist, "beatles">, <"title", "help">, <year, "1967">}
m2: {<artist, "crosby stills nash & young">, <title, "deja vu">, <year, 1967>}

Connecting all these files via a distributed sharing mechanism, which allows for browsing, requires navigation through a hierarchy created by another person. As noted above, the indexing technique according to the alternate embodiment creates an intuitive virtual structure of all the combined information that is navigable. Files are visible in all the possible places where they might reasonably be sought. Thus, a directory "/artist/beatles" lists the files f1, j1, m1; a directory "/artist/beatles/and/year/1967" narrows this list to the files f1, m1. Similarly, a directory "/year/1967" lists the files f1, f2, j2, m1 and m2.

The directories as presented in this example are seen as if they were conventionally displayed by a known file system (e.g., a NFS client). Applications or end-users are able to manipulate the files in the same manner as conventionally listed files. Thus, end-users can navigate using standard tools, such as Windows Explorer, copy files using the standard file manipulation commands of their particular operating system, or open the files using applications, such as word processors, or MP3 players.

A new information organization paradigm has herein been disclosed, which is semantic rather than physical. Documents are presented to the user, not according to their real physical path, but rather in a context sensitive manner, which attempts to present the user with the relevant information at each moment in time. Thus, an associative access to content is established. This solution to the problem of information management allows users to remain within a familiar working application environment, rather than requiring mastery and separate use of yet another information management tool. The user is provided with information, which is always organized according to his current needs. The organization of the information is dynamic, in that document updates are immediately integrated into the hierarchical views presented to the user.

While this invention has been explained with reference to the structure disclosed herein, it is not confined to the details set forth, and this application is intended to cover any modifications and changes as may come within the scope of the following claims.

The invention claimed is:

1. A computer implemented method of information retrieval from a federated repository, comprising the steps of:

for each data source in said federated repository including multiple data sources generating an inverted repository index in a common format to define a plurality of inverted repository indices;

merging said inverted repository indices into a multidimensional master index wherein semantically common elements of said inverted repository indices are fused into a single element;

accepting a query for information contained in said federated repository;

responsive to said query, consulting said multidimensional master index to identify documents of said federated repository having characteristics semantically consistent with said query; and displaying virtual directory paths of said documents that are organized according to semantics of said documents.

2. The computer implemented method according to claim 1, wherein said step of merging is performed by:

merging different ones of said repository indices into a plurality of secondary merged indices; and merging said secondary merged indices into said multidimensional master index.

3. The computer implemented method according to claim 1, wherein an identification of said documents of said federated repository includes a data source of origin, and an identification of one of said repository indices.

4. The computer implemented method according to claim 1, further comprising the step of dynamically adding new repository indices and deleting current ones of said repository indices that respectively become available and unavailable in said federated repository.

5. The computer implemented method according to claim 1, wherein said step of consulting said multidimensional master index comprises simultaneously consulting different ones of said repository indices that are merged therein.

6. The computer implemented method according to claim 1, wherein said step of generating said repository index in said common format is performed using a XML parser.

7. A computer software product, comprising a computer-readable medium in which computer program instructions are stored, which instructions, when read by a computer, cause the computer to perform a method of information retrieval from a federated repository, comprising the steps of:

for each data source in said federated repository including multiple data sources generating an inverted repository index in a common format; merging each said inverted repository index into a multidimensional master index wherein semantically common elements of each said inverted repository index are fused into a single element in said multidimensional master index;

accepting a query for information contained in said federated repository;

responsive to said query, consulting said multidimensional master index to identify documents of said federated repository having characteristics semantically consistent with said query; and displaying virtual directory paths of said documents that are organized according to semantics of said documents.

8. The computer software product according to claim 7, wherein said step of merging is performed by:

merging different portions of each said inverted repository index into secondary merged indices; and merging said secondary merged indices into said multidimensional master index.

9. The computer software product according to claim 7, wherein an identification of said documents of said federated repository includes a data source of origin, and an identification of said repository index.

10. The computer software product according to claim 7, further comprising the step of dynamically adding new repository indices and deleting current repository indices that respectively become available and unavailable in said federated repository.

11. The computer software product according to claim 7, wherein said step of consulting said multidimensional master index comprises simultaneously consulting different repository indices that are merged therein.

12. The computer software product according to claim 7, wherein said step of generating an inverted repository index is performed using a XML parser.

13. An information retrieval system for accessing a federated repository comprising:

a master server linked to a plurality of client servers, each of said client servers having a data source of said federated repository including multiple data sources stored therein, said client servers each having access to a first program for generating an inverted repository index of said data source in a predetermined format, said master server having a second program for merging said inverted repository indices of said client servers into a multidimensional master index, wherein semantically common elements of said inverted repository indices are fused into a single element in said multidimensional master index, said master server having a third program for accepting a query for information contained in said federated repository, and responsive to said query, consulting said multidimensional master index to identify documents of said federated repository having characteristics semantically consistent with said query, and providing a display of virtual directory paths of said documents that are organized according to semantics of said documents.

14. The information retrieval system according to claim 13, wherein an identification of said documents of said federated repository includes its associated data source.

15. The information retrieval system according to claim 14, wherein said identification of said documents further includes an identification of one of said inverted repository indices.

16. The information retrieval system according to claim 13, wherein said second program of said master server is adapted for dynamically adding new repository indices and deleting current ones of said inverted repository indices that respectively become available and unavailable in said federated repository.

* * * * *